(12) United States Patent
Kim et al.

(10) Patent No.: US 11,677,536 B2
(45) Date of Patent: Jun. 13, 2023

(54) TRANSCEIVER AND METHOD OF DRIVING THE SAME

(71) Applicant: SAMSUNG DISPLAY CO., LTD., Yongin-si (KR)

(72) Inventors: Hyun Su Kim, Yongin-si (KR); Dong Won Park, Yongin-si (KR); Jun Dal Kim, Yongin-si (KR); Kyung Youl Min, Yongin-si (KR); Jong Man Bae, Yongin-si (KR); Jun Yong Song, Yongin-si (KR); Tae Young Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/574,860

(22) Filed: Jan. 13, 2022

(65) Prior Publication Data
US 2022/0399986 A1    Dec. 15, 2022

(30) Foreign Application Priority Data
Jun. 14, 2021   (KR) ........................ 10-2021-0077052

(51) Int. Cl.
*H04L 7/04*   (2006.01)
*H04L 7/00*   (2006.01)

(52) U.S. Cl.
CPC .................................. *H04L 7/0037* (2013.01)

(58) Field of Classification Search
CPC . H04L 7/0037; H04L 41/0803; H04L 7/0016; G06F 1/12; H04B 17/21; H03L 7/22

USPC ................ 375/362, 356, 371, 373, 375, 376
See application file for complete search history.

(56) References Cited

U.S. PATENT DOCUMENTS

| 7,176,763 B2 | 2/2007 | Park |
| 7,190,931 B2 * | 3/2007 | Casper ................... H04B 17/21 |
| | | 455/67.14 |
| 9,466,263 B2 | 10/2016 | Bae et al. |
| 10,313,100 B2 | 6/2019 | Yim |
| 10,516,400 B2 | 12/2019 | Huh et al. |
| 10,587,491 B1 * | 3/2020 | Volpe .................. H04L 41/0803 |

(Continued)

FOREIGN PATENT DOCUMENTS

| KR | 100574980 B1 | 4/2006 |
| KR | 1020080011527 A | 2/2008 |

(Continued)

*Primary Examiner* — Phuong Phu
(74) *Attorney, Agent, or Firm* — Cantor Colburn LLP

(57) ABSTRACT

A transceiver includes a transmitter and a receiver connected to each other through a first line and a second line. The transmitter transmits signals having a first voltage range to the first line and the second line in a first mode, and transmits signals having a second voltage range less than the first voltage range to the first line and the second line in a second mode. In transmitting a (1-1)-th payload to the receiver, the transmitter is sequentially driven in the first mode, the second mode, and the first mode, and transmits a first clock training pattern and the (1-1)-th payload in the second mode. The receiver includes a clock data recovery circuit generating a first clock signal corresponding to the received first clock training pattern and a register storing first frequency information and first phase information of the first clock training pattern.

18 Claims, 14 Drawing Sheets

(56) References Cited

U.S. PATENT DOCUMENTS

| | | | |
|---|---|---|---|
| 10,657,875 B2 | 5/2020 | Chung et al. | |
| 10,726,808 B2 | 7/2020 | Han et al. | |
| 10,796,661 B2 | 10/2020 | Park | |
| 10,943,559 B2 | 3/2021 | Park | |
| 2007/0297552 A1 | 12/2007 | Bae et al. | |
| 2010/0220748 A1* | 9/2010 | Inomata | G06F 1/12 370/503 |
| 2012/0115952 A1 | 8/2012 | Werner et al. | |
| 2015/0229467 A1* | 8/2015 | Lee | H04L 7/0016 375/371 |
| 2016/0299870 A1* | 10/2016 | Mitric | H03L 7/22 |
| 2021/0118356 A1 | 4/2021 | Lim et al. | |

FOREIGN PATENT DOCUMENTS

| | | |
|---|---|---|
| KR | 101671018 B1 | 10/2016 |
| KR | 101938674 B1 | 1/2019 |
| KR | 1020190052186 A | 5/2019 |
| KR | 1020190055466 A | 5/2019 |
| KR | 102071573 B1 | 1/2020 |
| KR | 1020200024984 A | 3/2020 |
| KR | 1020200041406 A | 4/2020 |

\* cited by examiner

TRANSCEIVER AND METHOD OF DRIVING THE SAME

This application claims priority to Korean Patent Application No. 10-2021-0077052, filed on Jun. 14, 2021, and all the benefits accruing therefrom under 35 U.S.C. § 119, the content of which in its entirety is herein incorporated by reference.

BACKGROUND

1. Field

Embodiments of the invention relate to a transceiver and a method of driving the same.

2. Description of the Related Art

As an information technology is developed, an importance of a display device that is a connection medium between a user and information is emphasized. In response to this, a use of a display device such as a liquid crystal display device and an organic light-emitting display device is increasing.

SUMMARY

In general, a display device may perform internal communication using a mobile industry processor interface ("MIPI") protocol. At this time, a clock line may be separately desired in using the MIPI protocol. When the clock line exists, there is a disadvantage in that physical/spatial cost increases and power consumption increases.

Embodiments of the invention provide a transceiver and a method of driving the same capable of reducing a locking time of a clock training pattern.

In an embodiment of the invention, a transceiver includes a transmitter and a receiver connected to each other through a first line and a second line. The transmitter transmits first signals having a first voltage range to the first line and the second line in a first mode, and transmits second signals having a second voltage range less than the first voltage range to the first line and the second line in a second mode In transmitting a (1-1)-th payload to the receiver, the transmitter is sequentially driven in the first mode, the second mode, and the first mode, and transmits a first clock training pattern and the (1-1)-th payload in the second mode, and the receiver includes a clock data recovery circuit generating a first clock signal corresponding to the first clock training pattern transmitted from the transmitter to the receiver, and a register storing first frequency information and first phase information of the first clock training pattern.

In an embodiment, the clock data recovery circuit may receive the first clock training pattern and the (1-1)-th payload, and receive a second clock training pattern and a (1-2)-th payload after a predetermined period, and the clock data recovery circuit may generate a second clock signal corresponding to the second clock training pattern.

In an embodiment, the clock data recovery circuit may generate the first clock signal by the first frequency information and the first phase information.

In an embodiment, the register may provide the first frequency information and the first phase information to the clock data recovery circuit, and the clock data recovery circuit may generate second frequency information of the second clock training pattern based on the first frequency information, and generate second phase information based on the first phase information.

In an embodiment, a time for tracking at least one of the second frequency information and the second phase information may be different from a time for tracking the first frequency information and the first phase information.

In an embodiment, the time for tracking at least one of the second frequency information and the second phase information may be shorter than the time for tracking the first frequency information and the first phase information.

In an embodiment, the clock data recovery circuit may receive the second clock training pattern and the (1-2)-th payload, and receive a third clock training pattern and a (1-3)-th payload after a predetermined period.

In an embodiment, the register may store the second frequency information and the second phase information, and provide the second frequency information and the second phase information to the clock data recovery circuit, and the clock data recovery circuit may generate third frequency information of the third clock training pattern based on the second frequency information, and generate third phase information of the third clock training pattern based on the second phase information.

In an embodiment, a time for tracking at least one of the third frequency information and the third phase information may be shorter than the time for tracking the first frequency information and the first phase information and may be different from the time for tracking the second frequency information and the second phase information.

In an embodiment, the register may store second phase information of the second clock training pattern, and provide the first frequency information and the second phase information to the clock data recovery circuit, and the clock data recovery circuit may reflect the first frequency information to use the first frequency information as third frequency information of the third clock training pattern, and generate third phase information of the third clock training pattern based on the second phase information.

In an embodiment of the invention, a transceiver includes a transmitter including a first data transmitter, and a receiver including a first data receiver connected to the first data transmitter through a first line and a second line. The first data receiver includes a clock data recovery circuit which generates a first clock signal corresponding to a first clock training pattern, and a register which stores first frequency information and first phase information of the first clock training pattern. The clock data recovery circuit receives a first clock training pattern and a (1-1)-th payload from the first data transmitter, and receives a second clock training pattern and a (1-2)-th payload after a predetermined period, and a time for tracking second frequency information and second phase information of the second clock training pattern is shorter than a time for tracking the first frequency information and the first phase information.

In an embodiment, the clock data recovery circuit may include a frequency counter which counts the first frequency information of the first clock training pattern and provides the first frequency information to the register, and a phase counter which counts the first phase information of the first clock training pattern and the (1-1)-th payload and provides the first phase information to the register.

In an embodiment, in the second clock training pattern, the register may provide the first frequency information to the frequency counter, and the frequency counter may count the second frequency information from the second clock training pattern based on the first frequency information.

In an embodiment, in the second clock training pattern, the register may provide the first phase information to the phase counter, and the phase counter may count the second phase information from the second clock training pattern based on the first phase information.

In an embodiment, the clock data recovery circuit may receive the second clock training pattern and the (1-2)-th payload from the first data transmitter, and receive a third clock training pattern and a (1-3)-th payload after a predetermined period, and a time for tracking third frequency information and third phase information of the third clock training pattern may be shorter than the time for tracking the first frequency information and the first phase information and may be different from the time for tracking the second frequency information and the second phase information.

In an embodiment, in the third clock training pattern, the register may provide the second frequency information to the frequency counter, and the frequency counter may count the third frequency information based on the second frequency information.

In an embodiment, in the third clock training pattern, the register may provide the second phase information to the phase counter, and the phase counter may count the third phase information based on the second phase information.

In an embodiment, in the third clock training pattern, the register may provide the first frequency information to the frequency counter, and the frequency counter may reflect the first frequency information to use the first frequency information as the third frequency information of the third clock training pattern.

In an embodiment of the invention, a method of driving a transceiver including a transmitter and a receiver connected through a first line and a second line includes transmitting, by the transmitter, first signals having a first voltage range to the first line and the second line in a first mode, transmitting, by the transmitter, second signals having a second voltage range less than the first voltage range to the first line and the second line in a second mode, and sequentially transmitting, by the transmitter, the signals having the first voltage range to the first line and the second line in the first mode. The transmitting the second signals includes transmitting a (1-1)-th payload and a (1-2)-th payload to the receiver in the second mode, and transmitting a second clock training pattern and the (1-2)-th payload after a predetermined period. The method further includes receiving, by the receiver, the second clock training pattern and the (1-2)-th payload after a predetermined period after receiving the first clock training pattern and the (1-1)-th payload, and a time for tracking second frequency information and second phase information of the second clock training pattern is shorter than a time for tracking first frequency information and first phase information of the first clock training pattern.

In an embodiment, the receiver may receive a third clock training pattern and a (1-3)-th payload after a predetermined period after receiving the second clock training pattern and the (1-2)-th payload, and a time for tracking third frequency information and third phase information of the third clock training pattern may be shorter than the time for tracking the first frequency information and the first phase information and may be different from the time for tracking the second frequency information and the second phase information.

In an embodiment, when tracking at least one of frequency information and phase information of a current clock training pattern, since at least one of frequency information and phase information of a previous clock training pattern is used, a locking time for tracking at least one of the frequency information and the phase information of the current clock training pattern may be shortened.

Therefore, in an embodiment, a time for generating a clock signal may be shortened by recovering a clock training pattern.

An effect in an embodiment is not limited by the above-exemplified contents, and more various effects are included in the specification.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
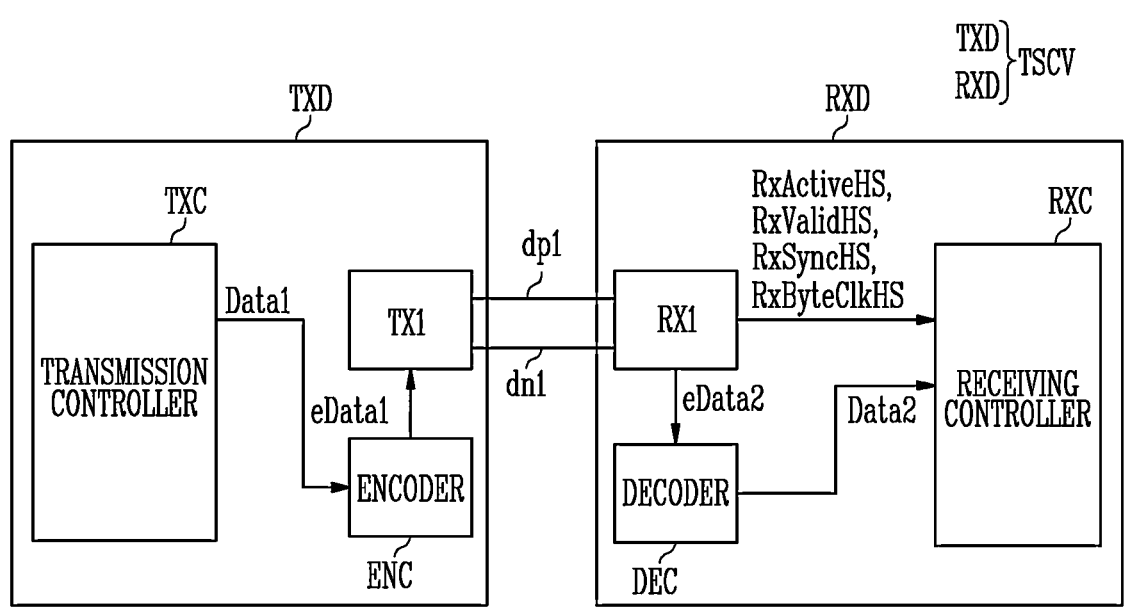
FIGS. 1 and 2 are diagrams illustrating an embodiment of a transceiver.

Embodiments of the invention may be modified in various manners and have various forms. Therefore, specific embodiments will be illustrated in the drawings and will be described in detail in the specification. However, it should be understood that the disclosure is not intended to be limited to the disclosed specific forms, and the disclosure includes all modifications, equivalents, and substitutions within the spirit and technical scope of the invention.

Terms of "first", "second", and the like may be used to describe various components, but the components should not be limited by the terms. The terms are used only for the purpose of distinguishing one component from another component. Without departing from the scope of the invention, a first component may be referred to as a second component, and similarly, a second component may also be referred to as a first component, for example. The singular expressions include plural expressions unless the context clearly indicates otherwise.

It should be understood that in the application, a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Hereinafter, a transceiver in an embodiment of the invention is described with reference to the drawings related to embodiments of the invention.

Figure 2:
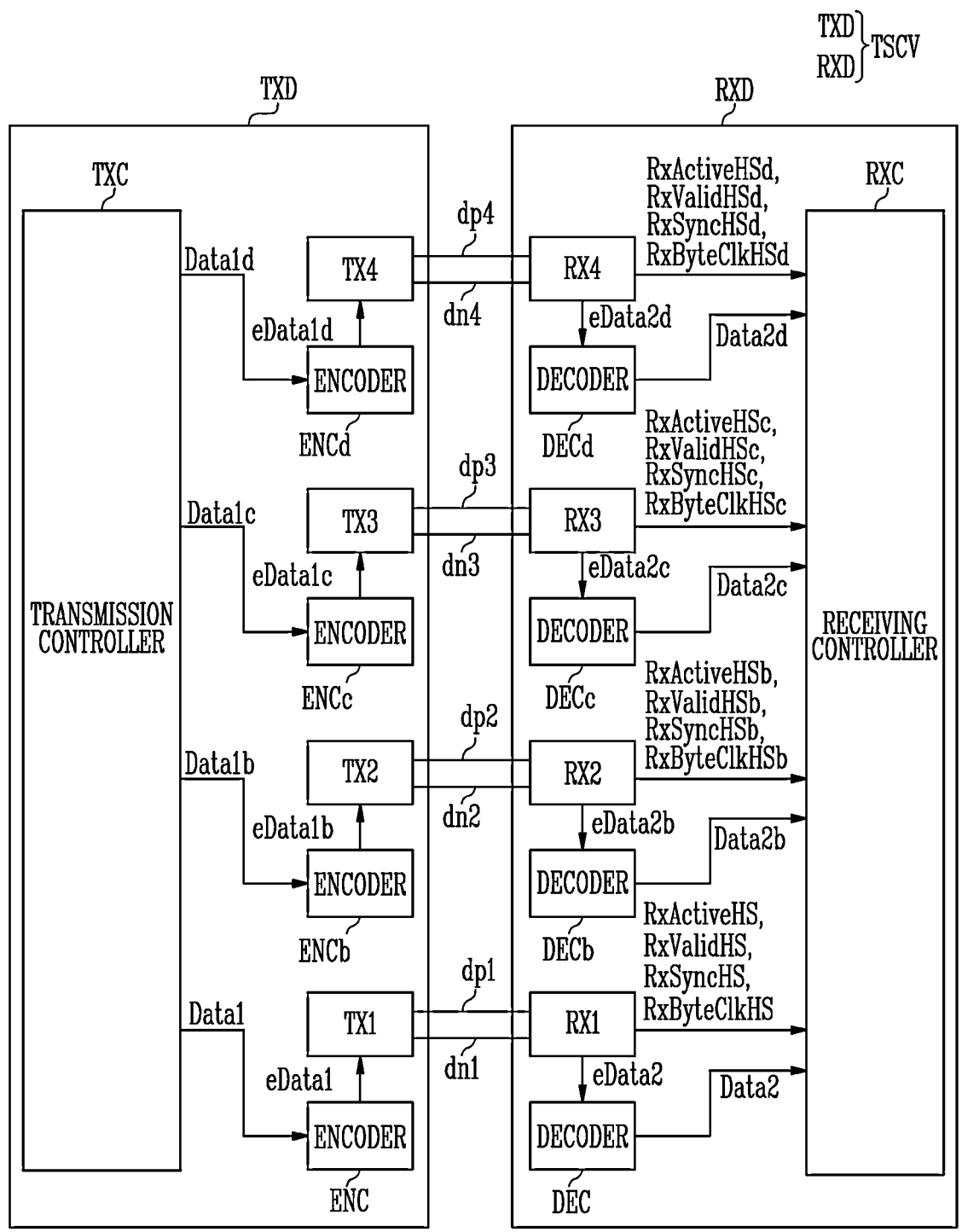

FIGS. 1 and 2 are diagrams illustrating an embodiment of a transceiver.

Referring to FIGS. 1 and 2, the transceiver TSCV in an embodiment may include a transmitter TXD and a receiver RXD.

The transmitter TXD may include a transmission controller TXC, a first data transmitter TX1, and an encoder ENC. The receiver RXD may include a receiving controller RXC, a first data receiver RX1, a decoder DEC, and a delay circuit.

The first data transmitter TX1 may be connected to the first data receiver RX1 through a first line dp1 and a second line dn1. The first data transmitter TX1 and the first data receiver RX1 may be also referred to as a first data channel. The first data transmitter TX1 and the first data receiver RX1 may correspond to a physical layer and a data link layer of an open systems interconnection ("OSI") 7 layer model, may correspond to a network interface of a transmission control protocol/internet protocol ("TCP/IP") protocol, or may correspond to a physical layer of a mobile industry processor interface ("MIPI") protocol. The physical layer of the MIPI protocol may be configured according to various predetermined specifications, such as D-PHY, C-PHY, and M-PHY. Hereinafter, a case where the first data transmitter TX1 and the first data receiver RX1 are configured according to the D-PHY specification among the physical layers of the MIPI protocol is described as an example.

The transmission controller TXC and the receiving controller RXC may correspond to a network layer and a transport layer of the OSI 7 layer model, or may correspond to Internet and transport of the TCP/IP protocol, or may correspond to a protocol layer of the MIPI protocol. The protocol layer of the MIPI protocol may be configured according to various predefined specifications such as a display serial interface ("DSI") and a camera serial interface ("CSI"). Hereinafter, a case where the transmission controller TXC and the receiving controller RXC are configured according to the DSI specification among the protocol layers of the MIPI protocol is described as an example.

The transmission controller TXC, the first data transmitter TX1, and the encoder ENC may be configured separately from each other in hardware, or may have a configuration in which two or more are integrated in hardware. The transmission controller TXC, the first data transmitter TX1, and the encoder ENC may be configured separately from each other in software, or may have a configuration in which two or more are integrated in software. In an embodiment, the transmitter TXD may be configured as a part (hardware or software) of another controller (e.g., an application processor ("AP"), a graphics processing unit ("GPU"), a central processing unit ("CPU"), or the like), or may be configured as independent hardware (e.g., a transmission dedicated integrated circuit ("IC")).

The receiving controller RXC, the first data receiver RX1, the decoder DEC, and the delay circuit may be separately from each other in hardware, or may have a configuration in which two or more are integrated in hardware. The receiving controller RXC, the first data receiver RX1, the decoder DEC, and the delay circuit may be configured separately from each other in software, or may have a configuration in which two or more are integrated in software. In an embodiment, the receiver RXD may be configured as a part (hardware or software) of another controller (e.g., a timing controller ("TCON"), a TCON embedded driver IC ("TED"), a driver IC ("D-IC"), or the like), or may be configured as independent hardware (e.g., a receiving dedicated IC).

The transmission controller TXC may provide first data Data1 including a third payload (that is, an original payload) to the encoder ENC. The encoder ENC may encode the first data Data1 to generate first encoded data eData1 including a first payload (that is, an encoded payload), and provide the first encoded data eData1 to the first data transmitter TX1. The first data transmitter TX1 may transmit other data by adding the other data before and after the first encoded data eData1 according to a predetermined protocol.

The first data receiver RX1 may generate a clock signal using the first encoded data eData1 and sample data received through the first line dp1 and the second line dn1 based on the generated clock signal. In an embodiment, the first data receiver RX1 may include a clock data recovery circuit CDR (refer to FIG. 6), a de-serializer DES (refer to FIG. 6), a register REG (refer to FIG. 6), or the like, for example. The first data receiver RX1 may provide second encoded data eData2 including the same first payload as that of the first encoded data eData1 to the decoder DEC. The decoder DEC may decode the second encoded data eData2 to generate second data Data2 including the same payload as that of the first data Data1, and provide the second data Data2 to the receiving controller RXC.

The first data receiver RX1 may generate a plurality of control signals RxActiveHS, RxValidHS, RxSyncHS, and RxByteClkHS necessary according to a protocol. At this time, the delay circuit may delay the plurality of control signals RxActiveHS, RxValidHS, RxSyncHS, and RxByteClkHS by a decoding time and provide the plurality of control signals RxActiveHS, RxValidHS, RxSyncHS, and RxByteClkHS to the receiving controller RXC. Here, the decoding time may be a time desired for the decoder DEC to decode the second encoded data eData2 to generate the second data Data2.

In addition, the control signal RxByteClkHS may be a clock signal for informing a data transmitter of a byte unit. In an embodiment, the control signal RxByteClkHS may indicate that one byte of the second data Data2 is transmitted for each one cycle of the control signal RxByteClkHS, for example. In addition, the control signal RxByteClkHS may be a clock signal used for data processing in the receiving controller RXC. In an embodiment, the control signal RxByteClkHS may be the entire system clock for data processing after the de-serializer, for example.

The transceiver TSCV of FIG. 1 is configured with one data channel as an example, but the transceiver TSCV may be configured with a plurality of data channels (e.g., four data channels) as shown in FIG. 2.

Referring to FIG. 2, the transmitter TXD may include second to fourth data transmitters TX2, TX3, and TX4 and corresponding encoders ENCb, ENCc, and ENCd. The receiver RXD may include second to fourth data receivers RX2, RX3, and RX4 and corresponding decoders DECb, DECc, and DECd. In addition, the receiver RXD may include a control signal generator and the delay circuit.

The second data transmitter TX2 may be connected to the second data receiver RX2 through a first line dp2 and a second line dn2. The second data transmitter TX2 and the second data receiver RX2 may be also referred to as a second data channel. The third data transmitter TX3 may be connected to the third data receiver RX3 through a first line dp3 and a second line dn3. The third data transmitter TX3 and the third data receiver RX3 may be also referred to as a third data channel. The fourth data transmitter TX4 may be connected to the fourth data receiver RX4 through a first line dp4 and a second line dn4. The fourth data transmitter TX4 and the fourth data receiver RX4 may be also referred to as a fourth data channel. The plurality of data channels may transmit and receive data independent of each other.

Since an operation of the encoders ENCb, ENCc, and ENCd encoding data Data1b, Data1c, and Data1d to generate encoded data eData1b, eData1c, and eData1d is substantially the same as an operation of the encoder ENC, a repetitive description is omitted.

Since an operation of the decoders DECb, DECc, and DECd decoding encoded data eData2b, eData2c, and eData2d to generate data Data2b, Data2c, and Data2d is substantially the same as an operation of the decoder DEC, a repetitive description is omitted.

The control signal generator may generate the control signals RxActiveHS, RxValidHS, RxSyncHS, and RxByteClkHS using data received by the second to fourth data receivers RX2, RX3, and RX4. In an embodiment, the control signal generator may align a timing of the data received by the second to fourth data receivers RX2, RX3, and RX4, and generate the control signals RxActiveHS, RxValidHS, RxSyncHS, and RxByteClkHS based on the aligned data, for example.

The delay circuit may delay the plurality of control signals RxActiveHS, RxValidHS, RxSyncHS, and RxByteClkHS by a decoding time and provide the plurality of control signals RxActiveHS, RxValidHS, RxSyncHS, and RxByteClkHS to the receiving controller RXC. Here, the decoding time may be a time desired for the decoders DEC, DECb, DECc, and DECd to decode the second encoded data eData2, eData2b, eData2c, and eData2d to generate the second data Data2, Data2b, Data2c, and Data2d. In an embodiment, when the decoding times of the decoders DEC, DECb, DECc, and DECd are different from each other, the delay circuit may delay the plurality of control signals RxActiveHS, RxValidHS, RxSyncHS, and RxByteClkHS based on the slowest decoding time, for example.

Hereinafter, the transmitter is described with reference to FIGS. 3 and 4.

Figure 3:
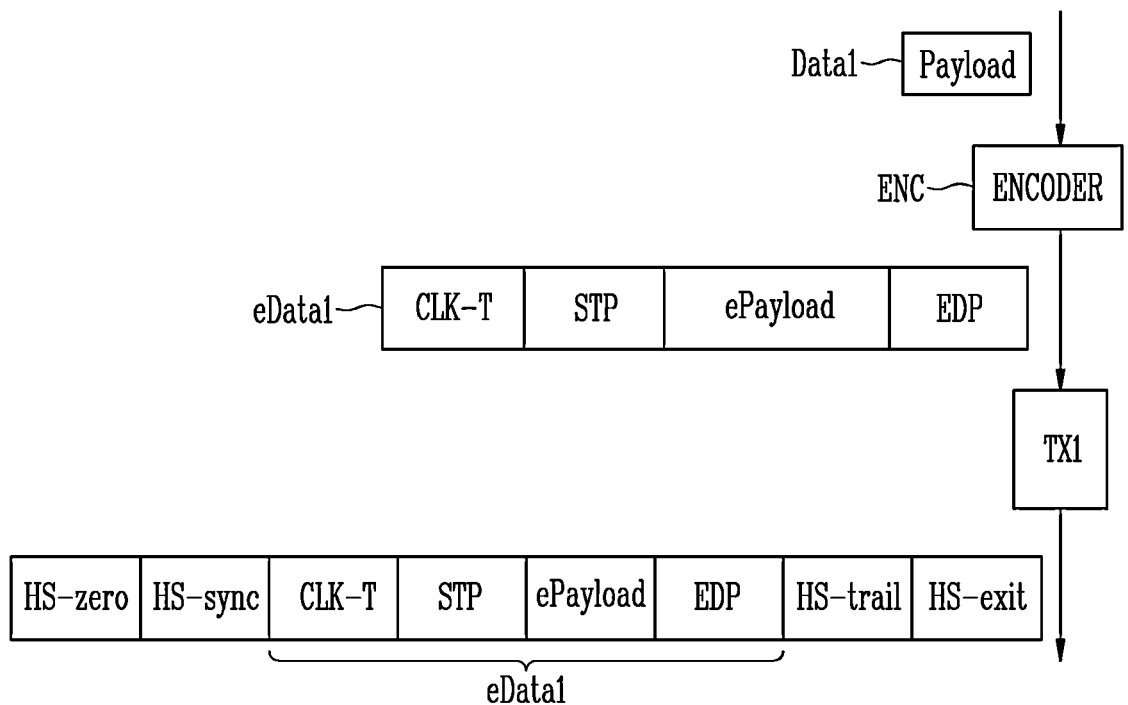
FIGS. 3 and 4 are diagrams illustrating an embodiment of an operation of a transmitter shown in FIGS. 1 and 2.
Figure 4:
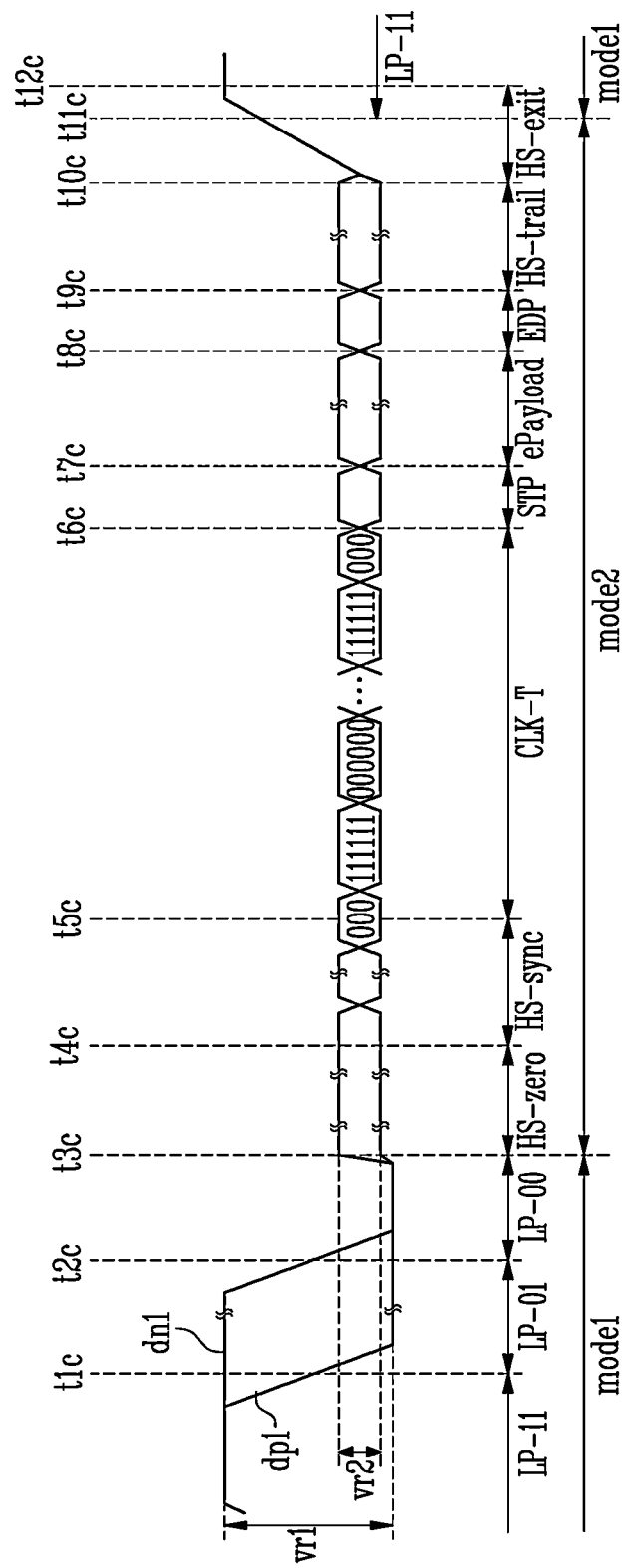

FIGS. 3 and 4 are diagrams illustrating an operation of the transmitter shown in FIGS. 1 and 2.

Referring to FIG. 3, the encoder ENC may receive the first data Data1 including the third payload Payload. The encoder ENC may encode the third payload Payload to generate a first payload ePayload, and add data before and after the first payload ePayload to generate the first encoded data eData1. In an embodiment, the first encoded data eData1 may sequentially include a clock training pattern CLK-T, a start pattern STP, the first payload ePayload, and an end pattern EDP, for example.

The clock training pattern CLK-T may include clock information. The receiver RXD may generate a clock signal having a predetermined frequency and a predetermined phase by the clock information. In an embodiment, the clock training pattern CLK-T may be a pattern in which one 1 and one 0 are repeated (e.g., 01010101 . . . ), for example. A frequency and a phase of the clock signal generated by the clock data recovery circuit of the receiver RXD may be undesirably changed by an external factor (noise, temperature, or the like). The receiver RXD may correct the frequency and the phase of the clock signal using the clock training pattern CLK-T. In another embodiment, the clock training pattern CLK-T may repeatedly include a plurality of successive 0s and a plurality of successive 1s (e.g., 00001111000001111 . . . ). In an embodiment, frequency information and phase information indicated by the clock training pattern CLK-T may vary according to the number of plurality of successive 0s or the number of plurality of successive 1s.

The start pattern STP may be a pattern informing a transmission start of the first payload ePayload. The start pattern STP may be a pattern that the first payload ePayload which is in an encoded state may not include, i.e., the start pattern STP may be a pattern that is inhibited from being used for the first payload ePayload. In an embodiment, the start pattern STP may be configured as 24b'011100_000000_111111_110001', for example.

The first payload ePayload may include the clock information. In an embodiment, when there are many successive 0s or many successive 1s in the third payload Payload, since transition of a signal may be small, a phase correction of the clock signal may not be sufficiently performed in the first data receiver RX1, and a skew of the clock signal may occur, for example. Therefore, the encoder ENC may perform encoding so that the number of transitions (a change from 0 to 1 or a change from 1 to 0) of the first payload ePayload is great compared to the third payload Payload. The encoder ENC may perform encoding so that the first payload ePayload periodically has a bit of a predetermined rule.

The end pattern EDP may be a pattern informing a transmission end of the first payload ePayload. In an embodiment, the end pattern EDP may be configured as 24b'011100_111111_000000_110001', for example. The end pattern EDP may be a pattern that the first payload ePayload which is in the encoded state may not include, i.e., the end pattern EDP may be a pattern that is inhibited from being used for the first payload ePayload, for example.

The first data transmitter TX1 may receive the first encoded data eData1 including the first payload ePayload. The first data transmitter TX1 may transmit other data by adding the other data before and after the first encoded data eData1 according to a predetermined protocol. In an embodiment, when the predetermined protocol is the MIPI protocol, the first data transmitter TX1 may sequentially transmit a pattern HS-zero, a pattern HS-sync, the first encoded data eData1, a pattern HS-trail, and a pattern HS-exit, for example.

Referring to FIG. 4, the transmitter TXD (in particular, the first data transmitter TX1) may transmit signals having a first voltage range vr1 to the first line dp1 and the second line dn1 in a first mode mode1. The transmitter TXD may transmit signals having a second voltage range vr2 less than the first voltage range vr1 to the first line dp1 and the second line dn1 in a second mode mode2.

In an embodiment, an upper limit of the first voltage range vr1 may be greater than an upper limit of the second voltage range vr2, and a lower limit of the first voltage range vr1 may be less than a lower limit of the second voltage range vr2, for example. When the MIPI protocol is applied to the transceiver TSCV, the first mode mode1 may be a low power ("LP") mode, and the second mode mode2 may be a high speed ("HS") mode.

In the first mode mode1, the first line dp1 and the second line dn1 may be used in a single-ended method. That is, the signals transmitted to each of the first line dp1 and the second line dn1 in the first mode mode1 may be the same or different from each other. In the second mode mode2, the first line dp1 and the second line dn1 may be used in a differential method. That is, the signals transmitted to each of the first line dp1 and the second line dn1 in the second mode mode2 are different from each other. The first line dp1 may be the positive line, and the second line dn1 may be the negative line.

In transmitting the first payload ePayload to the receiver RXD, the transmitter TXD may be sequentially driven in the first mode mode1, the second mode mode2, and the first mode mode1, and the transmitter TXD may transmit the clock training pattern CLK-T and the first payload ePayload in the second mode mode2.

In order to inform the switch from the first mode mode1 to the second mode mode2, the transmitter TXD may transmit the predefined patterns (e.g., a pattern LP-11, a pattern LP-01, and a pattern LP-00) to the first line dp1 and the second line dn1.

In an embodiment, the transmitter TXD may maintain the signals applied to the first line dp1 and the second line dn1 as a logic high level before a time point t1c (LP-11 pattern), for example. When a voltage level of the signal is greater than a first predefined threshold voltage level, the voltage level of the signal may be determined as the logic high level, and when the voltage level of the signal is less than a predefined second threshold voltage level, the voltage level of the signal may be determined as a logic low level. Next, at the time point t1c, the transmitter TXD may change the signal of the first line dp1 to the logic low level and maintain the signal of the second line dn1 as the logic high level (that is, the pattern LP-01). Next, at a time point t2c, the transmitter TXD may maintain the signal of the first line dp1 as the logic low level and change the signal of the second line dn1 to the logic low level (that is, the pattern LP-00).

Next, in the second mode mode2, the transmitter TXD may sequentially transmit the pattern HS-zero, the pattern HS-sync, the first encoded data eData1, the pattern HS-trail, and the pattern HS-exit described above. In an embodiment, the transmitter TXD may transmit the pattern HS-zero during a period t3c to t4c, transmit the pattern HS-sync during a period t4c to t5c, transmit the clock training pattern CLK-T during a period t5c to t6c, transmit the start pattern STP during a period t6c to t7c, transmit the first payload ePayload during a period t7c to t8c, transmit the end pattern EDP during a period t8c to t9c, transmit the pattern HS-trail during a period t9c to t10c, and transmit the pattern HS-exit after a time point t10c, for example.

The pattern HS-zero may be a pattern for informing a waiting period after entering from the first mode mode1 to the second mode mode1. In an embodiment, the pattern HS-zero may be a pattern in which 0 is repeated, for example.

The pattern HS-sync may be a pattern informing a transmission start of the first encoded data eData1. In an embodiment, the pattern HS-sync may have a value of 0xB8h or a value of 00011101, for example.

The pattern HS-trail may be a pattern informing a transmission end of the first encoded data eData1. The pattern HS-trail may be a pattern in which a value opposite to last data of the first encoded data eData1 is repeated. In an embodiment, when the last data (bit) of first encoded data eData1 is 0, the pattern HS-trail may be a pattern in which 1 is repeated, for example. In an embodiment, when the last data (bit) of the first encoded data eData1 is 1, the pattern HS-trail may be a pattern in which 0 is repeated, for example.

The pattern HS-exit may be a pattern informing that the second mode mode2 is ended and the first mode mode1 is started. The pattern HS-exit may not consist of a predetermined bit, but may be a transitional pattern in which a voltage is increased to exceed the second voltage range vr2. The transmit the pattern HS-exit may be transmitted from the time point t10c to a time point t12c.

The transmitter TXD may change the signals applied to the first line dp1 and the second line dn1 to the logic high level from a time point t11c (that is, the pattern LP-11). Accordingly, the transmitter TXD may inform that the second mode mode2 is ended and the first mode mode1 is started.

The receiver RXD may generate the clock signal using the clock training pattern CLK-T and the first payload ePayload. The first data receiver RX1 may include a clock data recovery circuit CDR (refer to FIGS. 6 and 7) and may generate a clock signal having predetermined frequency and phase using the clock training pattern CLK-T. In addition, the first data receiver RX1 may continuously correct the phase of the clock signal to prevent skew of the clock signal using the first encoded data eData1. The first data receiver RX1 may sample the received data using the generated clock signal. Therefore, in the illustrated embodiment, the transceiver TSCV capable of communicating using the MIPI protocol without a clock line may be provided.

Hereinafter, the receiver is described with reference to FIGS. 5 and 6.

Figure 5:
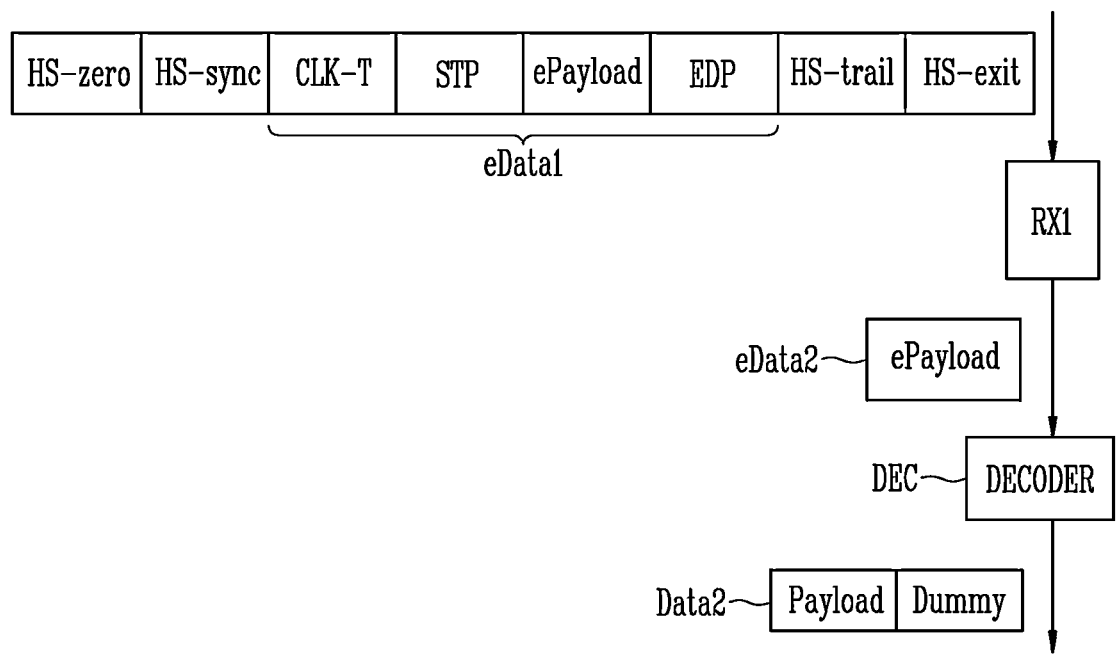
FIG. 5 is a diagram illustrating an embodiment of an operation of a receiver.
Figure 6:
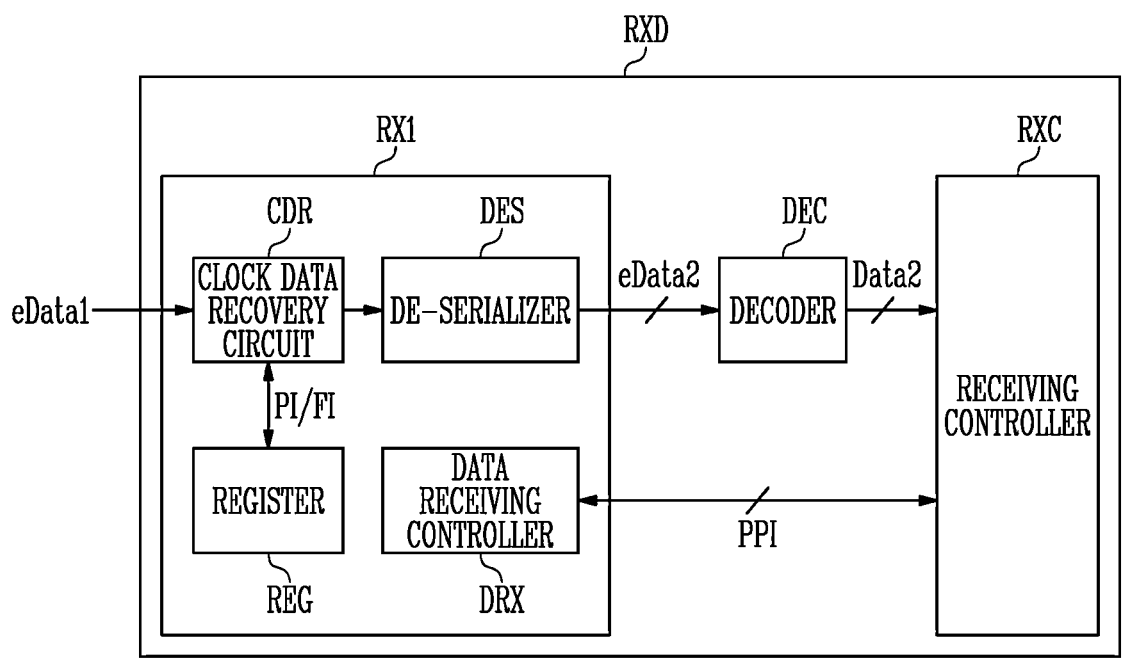
FIG. 6 is a diagram illustrating an embodiment of a configuration of a receiver.

FIG. 5 is a diagram illustrating an embodiment of an operation of a receiver, and FIG. 6 is a diagram illustrating an embodiment of a configuration of a receiver. Hereinafter, the invention is described with reference to FIGS. 1 to 4 together.

Referring to FIG. 5, the first data receiver RX1 may provide the second encoded data eData2 including the first payload ePayload among the received data to the decoder DEC.

The decoder DEC may decode the second encoded data eData2 (that is, the first payload ePayload) to generate the second data Data2, and provide the generated second data Data2 to the receiving controller RXC. The second data Data2 may include a second payload Payload and a dummy pattern Dummy. The second payload Payload is the same as the third payload of the first data Data1 provided by the transmission controller TXC.

The dummy pattern Dummy may be encoded in advance to be embedded in the first payload ePayload by the encoder ENC, or may be added by the decoder DEC. The dummy pattern Dummy may be data in which the same value is repeated. In an embodiment, when the last value of the second payload Payload is 0, the dummy pattern Dummy is data in which 1 is repeated, and when the last value of the second payload Payload is 1, the dummy pattern Dummy may be data in which 0 is repeated, for example. Therefore, since a format (the payload and the dummy pattern Dummy) of the second data Data2 received by the receiving controller RXC of FIG. 1 is the same as a format (the payload and additional information) of the second data received by the receiving controller of the transceiver according to a comparative example further including a separate clock line, there is an advantage in that an MIPI protocol interface is not desired to be changed even though the clock line is removed from the transceiver TSCV.

Similar to a case of the second data Data2, a format of the plurality of control signals RxActiveHS, RxValidHS, RxSyncHS, and RxByteClkHS generated by the receiver RXD (in particular, the first data receiver RX1) may be the same as a format of the plurality of control signals RxActiveHS, RxValidHS, RxSyncHS, and RxByteClkHS generated by a receiver RXD (in particular, a first data receiver RX1). Therefore, in the illustrated embodiment, there is an advantage in that the MIPI protocol interface is not desired to be changed even though the clock line is removed from the transceiver TSCV.

Referring to FIG. 6, the first data receiver RX1 may include the clock data recovery circuit CDR, the de-serializer DES, the register REG, and a data receiving controller DRX.

The clock data recovery circuit CDR may generate the clock signal corresponding to the received clock training pattern. That is, the clock data recovery circuit CDR may generate frequency information FI and phase information PI of the received training pattern.

In an embodiment, the clock data recovery circuit CDR may receive a first clock training pattern, generate a first clock signal by first frequency information and first phase information of the first clock training pattern, receive a second clock training pattern, generate a second clock signal using second frequency information and second phase information of the second clock training pattern, receive a third clock training pattern, and generate a third clock signal using third frequency information and third phase information of the third clock training pattern, for example.

The clock data recovery circuit CDR may store the frequency information FI and the phase information PI of the clock training pattern in the register REG, and receive the stored frequency information FI and the phase information PI from the register REG. That is, the clock data recovery circuit CDR may store the first frequency information and the first phase information of the first clock training pattern in the register REG, and thereafter, may use the frequency information FI and the phase information PI stored in the register REG when generating the frequency information FI and the phase information PI of the clock training pattern.

In an embodiment, the clock data recovery circuit CDR may generate second frequency information of the second clock training pattern based on the first frequency information, and may generate second phase information of the second clock training pattern based on the first phase information, for example. In addition, the clock data recovery circuit CDR may generate third frequency information of the third clock training pattern based on the second frequency information, and may generate third phase information of the third clock training pattern based on the second phase information.

In an embodiment, the clock data recovery circuit CDR may use the first frequency information as the third frequency information of the third clock training pattern, and may generate the third phase information of the third clock training pattern based on the second phase information.

The de-serializer DES may convert data output from a phase detector PD into a bus signal and output the bus signal. In an embodiment, the de-serializer DES may convert data output from the phase detector PD into a bus signal of 2:24, for example.

The register REG may store the frequency information FI and the phase information PI of the clock training pattern provided from the clock data recovery circuit CDR, and provide the frequency information FI and the phase information PI of the clock training pattern to the clock data recovery circuit CDR again.

In an embodiment, the register REG may store the first frequency information and the first phase information of the first clock training pattern, and allow to generate the second frequency information and the second phase information of the second clock training pattern by providing the first frequency information and the first phase information of the first clock training pattern in the second clock training pattern to the clock data recovery circuit CDR, for example. Accordingly, a time for tracking at least one of the second frequency information and the second phase information of the second clock training pattern, that is, a locking time, may be shorter than a time for tracking the first frequency information and the first phase information of the first clock training pattern, that is, a locking time.

In addition, the register REG may allow to generate the third frequency information and the third phase information of the third clock training pattern by providing the second frequency information and the second phase information of the second clock training pattern in the third clock training pattern to the clock data recovery circuit CDR. Accordingly, a locking time for tracking at least one of the third frequency information and the third phase information of the third clock training pattern may be shorter than the locking time of the first clock training pattern, and may be different from the locking time of the second clock training pattern.

In an embodiment, the register REG may allow to use the first frequency information in the third frequency information of the third clock training pattern by providing the first frequency information and the second phase information in the third clock training pattern to the clock data recovery circuit CDR, and may allow to generate the third phase information of the third clock training pattern based on the second phase information. This may be applied when an external factor such as a voltage or temperature applied to the clock data recovery circuit CDR in a predetermined period corresponds to a degree that does not affect a performance change of the clock data recovery circuit CDR.

The data receiving controller DRX may be an analog logic capable of performing receiving with the receiving controller RXC. The data receiving controller DRX may be included in the first data receiver RX1. The data receiving controller DRX may perform PHY protocol interface ("PPI") communication with the receiving controller RXC.

Hereinafter, the clock data recovery circuit is described in detail with reference to FIGS. 7 to 11.

Figure 7:
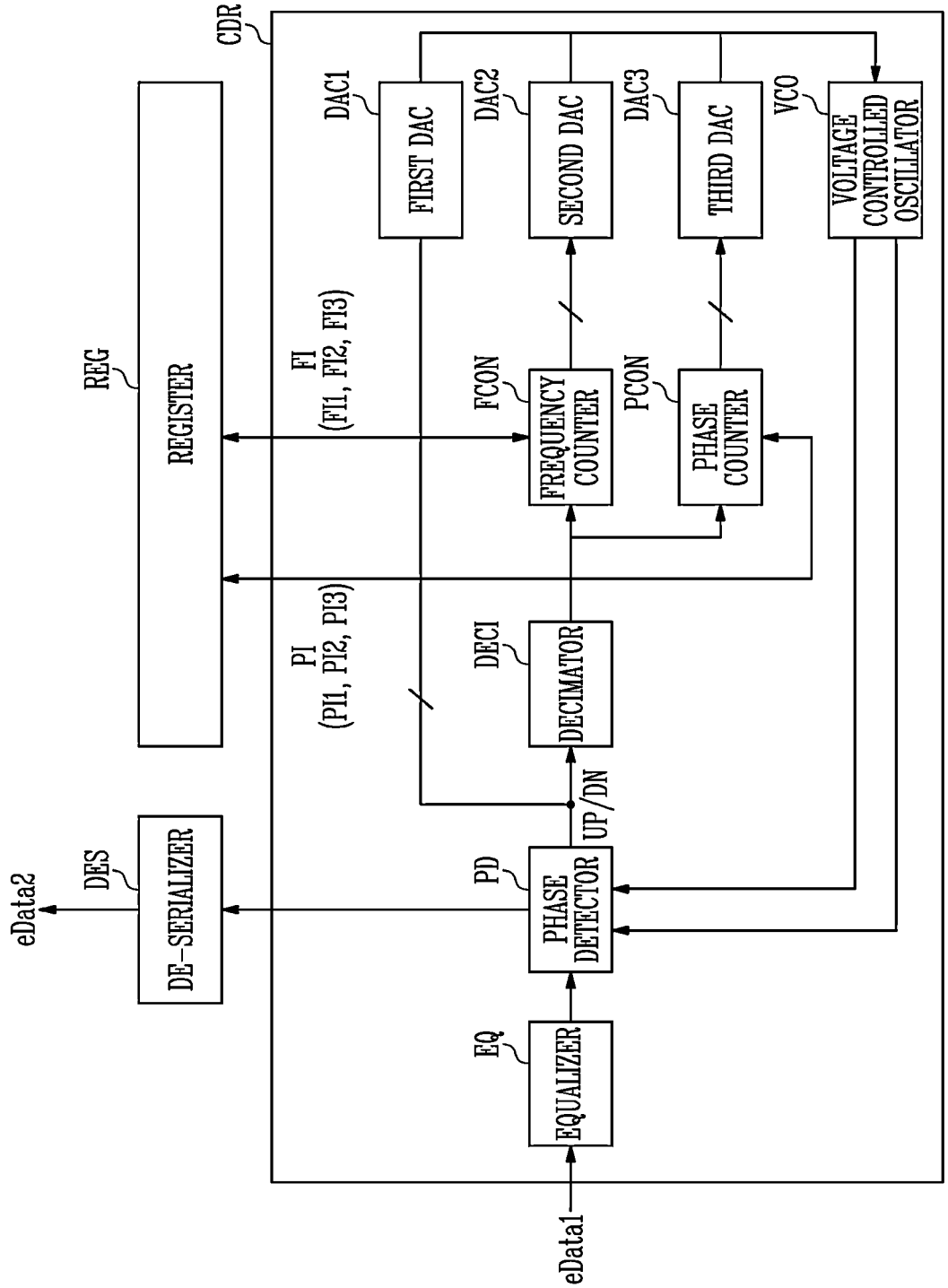
FIG. 7 is a diagram illustrating an embodiment of a clock data recovery circuit and a register.
Figure 8:
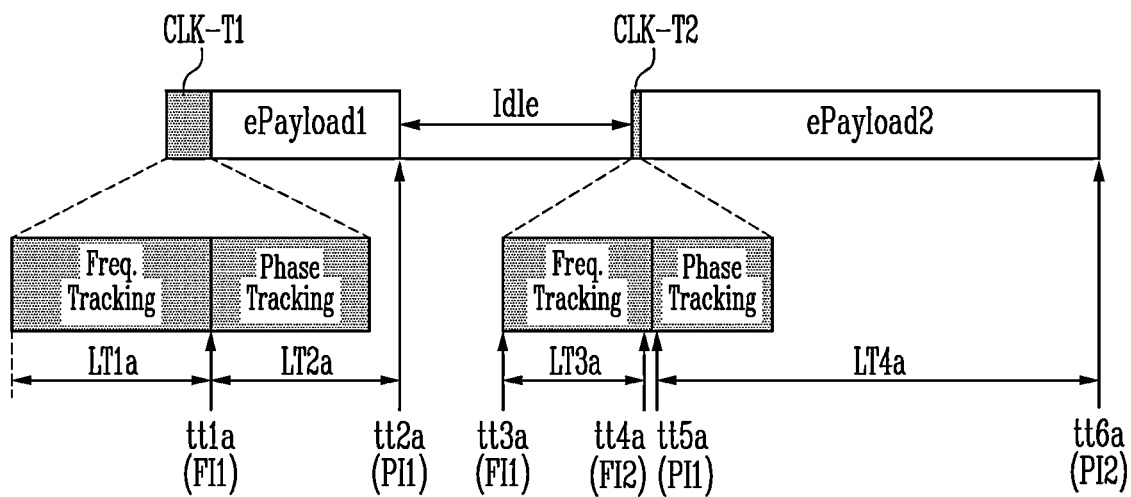
FIGS. 8 and 9 are diagrams illustrating an embodiment of an operation of a clock data recovery circuit.
Figure 9:
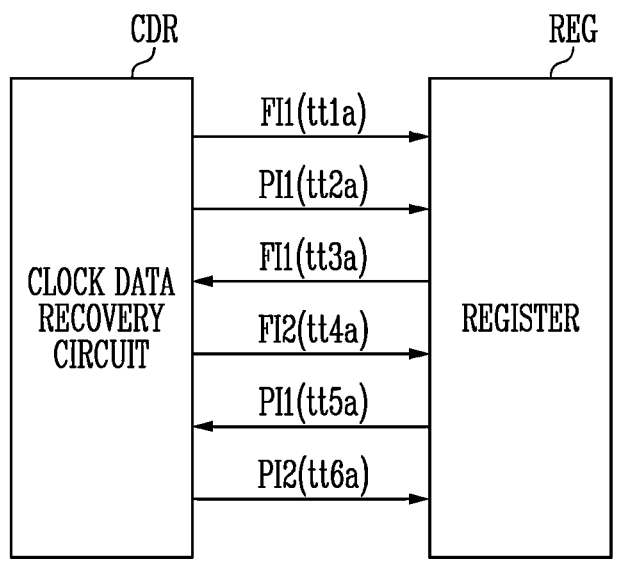
Figure 10:
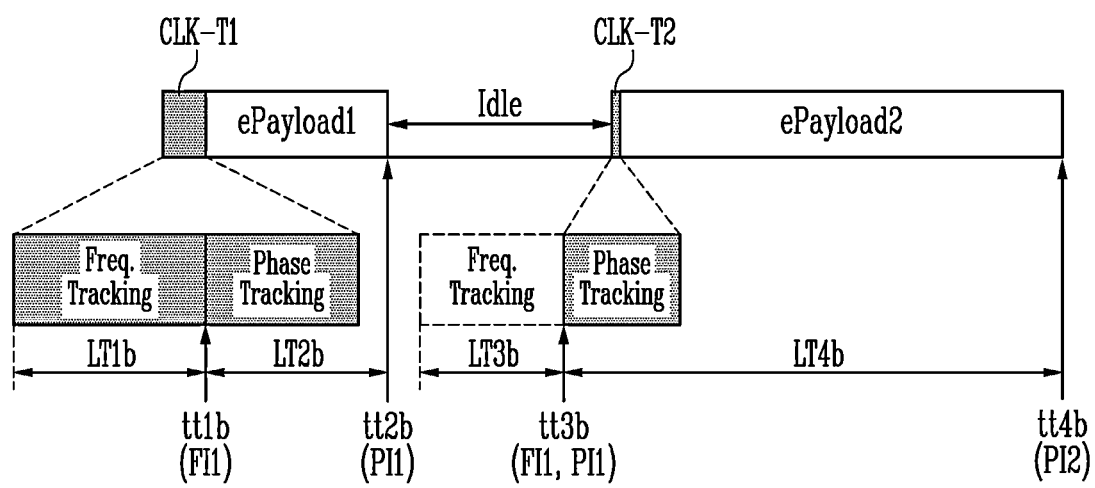
FIGS. 10 and 11 are diagrams illustrating an embodiment of an operation of a clock data recovery circuit.
Figure 11:
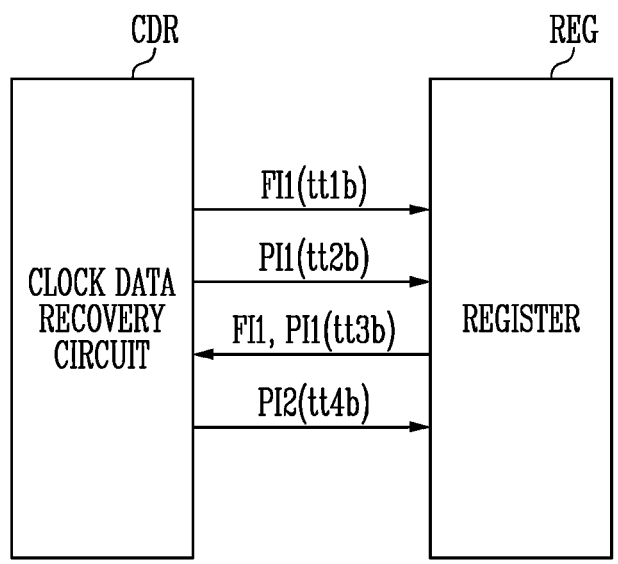

FIG. 7 is a diagram illustrating an embodiment of a clock data recovery circuit and a register, FIGS. 8 and 9 are diagrams illustrating an embodiment of an operation of a clock data recovery circuit, and FIGS. 10 and 11 are diagrams illustrating an embodiment of an operation of a clock data recovery circuit. Hereinafter, an embodiment of the invention is described with reference to FIGS. 1 to 6 together.

Referring to FIG. 7, the clock data recovery circuit CDR may include an equalizer EQ, the phase detector PD, a decimator DECI, a frequency counter FCON, a phase counter PCON, and a first digital-to-analog converter DAC1, a second digital-to-analog converter DAC2, a third digital-to-analog converter DAC3, and a voltage controlled oscillator VCO.

The equalizer EQ may equalize the input first encoded data eData1. The equalizer EQ may emphasize or reduce a predetermined frequency band when input data is distorted. In an embodiment, the equalizer EQ may be implemented as a continuous time linear equalizer ("CTLE"), for example, but the invention is not limited thereto.

The phase detector PD may compare at least one of a phase and a frequency between data provided through the equalizer EQ and a clock signal provided through the voltage controlled oscillator VCO. In an embodiment, the phase detector PD may be implemented as a differential bang-bang phase detector ("BBPD"), for example, but the invention is not limited thereto.

The decimator DECI may perform up/down digitization through a comparison value provided from the phase detector PD.

The frequency counter FCON may count the frequency information FI by detecting an edge of the clock training pattern. The frequency counter FCON may generate a frequency count signal according to a frequency counting result. At this time, the frequency counter FCON may generate the frequency count signal according to the frequency counting result of a current clock training pattern, by reflecting the frequency counting result of a previous clock training pattern.

The frequency counter FCON may provide a result of counting from the first clock training pattern (e.g., first frequency information FI1) to the register REG. The register REG may store a first counting result (e.g., the first frequency information FI1) counted from the first clock training pattern, and provide the first counting result (e.g., the first frequency information FI1) to the frequency counter FCON with respect to the second clock training pattern. Thereafter, in the second clock training pattern, the frequency counter FCON may update the frequency counting result (e.g., second frequency information FI2) by counting the frequency information from the second clock training pattern, based on the first counting result (e.g., the first frequency information FI1) provided from the register REG. That is, the frequency counter FCON may generate the second frequency information FI2 by adding the frequency counting result of the second clock training pattern to the first counting result (e.g., the first frequency information FI1).

Specifically, in order to generate the second frequency information FI2, the frequency counter FCON may control a signal (or a voltage) applied to the voltage controlled oscillator VCO through up/down signals UP/DN provided from the phase detector PD. In an embodiment, when a value initially output from the voltage controlled oscillator VCO by the first clock training pattern is about 2 gigahertz (GHz) and a value of the second clock training pattern applied to the clock data recovery circuit CDR is about 3 GHz, for example, the phase detector PD may provide the up signal to the frequency counter FCON, and the frequency counter FCON may control the signal (or the voltage) output to the voltage controlled oscillator VCO to be increased.

In addition, the frequency counter FCON may provide a second counting result (e.g., the second frequency information FI2) for the second clock training pattern to the register REG. The register REG may store the second counting result (e.g., the second frequency information FI2) counted from the second clock training pattern, and provide the second counting result (e.g., the second frequency information FI2) to the frequency counter FCON with respect to the third clock training pattern. Thereafter, in the third clock training pattern, the frequency counter FCON may update to the third frequency information FI3 by counting the frequency information in the third clock training pattern, based on the second counting result (e.g., the second frequency information FI2) provided from the register REG. That is, the frequency counter FCON may generate third frequency information FI3 by adding the frequency counting result of the third clock training pattern to the second counting result (e.g., the second frequency information FI2).

The register REG may not store the second counting result (e.g., the second frequency information FI2), and may provide the first counting result (e.g., the first frequency information FI1) to the frequency counter FCON with respect to the third clock training pattern. This may be applied when an external factor such as a voltage or temperature applied to the clock data recovery circuit CDR in a predetermined period corresponds to a degree that does not affect the performance change of the clock data recovery circuit CDR.

The phase counter PCON may count the clock training pattern and the phase information PI of the first payload ePayload. The phase counter PCON may generate a phase count signal according to a phase counting result. At this time, the phase counter PCON may generate the phase counting signal according to the phase counting result of the current clock training pattern by reflecting the phase counting result of the previous clock training pattern.

The phase counter PCON may provide a result counted from the first clock training pattern to the register REG. The register REG may store the first counting result (e.g., first phase information PI1) counted from the first clock training pattern, and provide the first counting result (e.g., the first phase information PI1) to the phase counter PCON with respect to the second clock training pattern. Thereafter, in the second clock training pattern, the phase counter PCON may update the phase counting result (e.g., second phase information PI2) by counting the phase information from the second clock training pattern, based on the first counting result (e.g., the first phase information PI1) provided from the register REG. That is, the phase counter PCON may generate the second phase information PI2 by adding the phase counting result of the second clock training pattern to the first counting result (e.g., the first phase information PI1).

Specifically, in order to generate the second phase information PI2, the phase counter PCON may control the signal (or the voltage) applied to the voltage controlled oscillator VCO through the up/down signals UP/DN provided from the phase detector PD.

In addition, the phase counter PCON may provide the second counting result (e.g., the second phase information PI2) for the second clock training pattern to the register REG. The register REG may store the second counting result (e.g., the second phase information PI2) counted from the second clock training pattern, and provide the second counting result (e.g., the second phase information PI2) to the phase counter PCON with respect to the third clock training pattern. Thereafter, in the third clock training pattern, the phase counter PCON may update to third phase information PI3 by counting the phase information in the third clock training pattern, based on the second counting result (e.g., the second phase information PI2) provided from the register REG. That is, the phase counter PCON may generate the third phase information PI3 by adding the phase counting result of the third clock training pattern to the second counting result (e.g., the second phase information PI2).

The first digital-to-analog converter DAC1 may convert the data output from the phase detector PD into an analog voltage and provide the analog voltage to the voltage controlled oscillator VCO. In an embodiment, the first digital-to-analog converter DAC1 may convert the first payload ePayload into an analog voltage and provide the analog voltage to the voltage controlled oscillator VCO, for example.

The second digital-to-analog converter DAC2 may convert data output from the frequency counter FCON into an analog voltage and provide the analog voltage to the voltage controlled oscillator VCO. In an embodiment, the second digital-to-analog converter DAC2 may convert data corresponding to a frequency counting signal into an analog voltage and provide the analog voltage to the voltage controlled oscillator VCO, for example.

The third digital-to-analog converter DAC3 may convert the data output from the phase counter PCON into an analog voltage and provide the analog voltage to the voltage controlled oscillator VCO. In an embodiment, the third digital-to-analog converter DAC3 may convert data corresponding to a phase counting signal into an analog voltage and provide the analog voltage to the voltage controlled oscillator VCO, for example.

The voltage controlled oscillator VCO may receive the voltages from each of the first digital-to-analog converter DAC1, the second digital-to-analog converter DAC2, and the third digital-to-analog converter DAC3, generate an output signal of which a frequency is changed according to an amplitude of an input voltage, and provide the output signal to the phase detector PD.

Referring to FIGS. 8 to 11, the clock data recovery circuit CDR may receive a first clock training pattern CLK-T1 and a (1-1)-th payload ePayload1. After a predetermined period (e.g., an idle period Idle) after receiving the (1-1)-th payload ePayload1, the clock data recovery circuit CDR may receive a second clock training pattern CLK-T2 and a (1-2)-th payload ePayload2.

The clock data recovery circuit CDR may track frequency information from the first clock training pattern CLK-T1 (Freq. Tracking). The frequency information tracked from the first clock training pattern CLK-T1 may be also referred to as the first frequency counting result (or the first frequency information FI1). At this time, the frequency counter FCON and the second digital-to-analog converter DAC2 may be enabled.

The frequency counter FCON of the clock data recovery circuit CDR may generate the first frequency counting result, and at a first time point tt1a, the frequency counter FCON may store the first frequency counting result (or the first frequency information FI1) in the register REG. Here, a time for tracking the first frequency information FI1 until the first time point tt1a may be also referred to as a first frequency locking time LT1a.

The clock data recovery circuit CDR may track the phase information from the first clock training pattern CLK-T1 (Phase Tracking). The phase information tracked from the first clock training pattern CLK-T1 may be also referred to as the first phase counting result (or the first phase information PI1). At this time, the phase counter PCON and the third digital-to-analog converter DAC3 may be enabled. In addition, the first digital-to-analog converter DAC1 that converts the first payload ePayload (or the (1-1)-th payload ePayload1) may be enabled.

The phase counter PCON of the clock data recovery circuit CDR may generate the first phase counting result (or the first phase information PI1), and at a second time point tt2a, the phase counter PCON may provide the first phase counting result (or the first phase information PI1) to the register REG. Since the (1-1)-th payload ePayload1 received after the first clock training pattern CLK-T1 may include the phase information of the first clock training pattern CLK-T1, the phase counter PCON may generate the first phase counting result (or the first phase information PI1) and store the first phase counting result (or the first phase information PI1) in the register REG at the second time point tt2a after the (1-1)-th payload ePayload1 is received. Here, a time for tracking the first phase information PI1 from the first time point tt1a to the second time point tt2a may be also referred to as a first phase locking time LT2a.

After the idle period Idle is elapsed, at a third time point tt3a, the clock data recovery circuit CDR may load the first frequency counting result (or the first frequency information FI1) from the register REG.

The clock data recovery circuit CDR may track the frequency information (or the second frequency information FI2) from the second clock training pattern CLK-T2 (Freq. Tracking). The frequency information tracked from the second clock training pattern CLK-T2 may be also referred to as the second frequency counting result (or the second frequency information FI2). At this time, the frequency counter FCON and the second digital-to-analog converter DAC2 may be enabled.

The frequency counter FCON of the clock data recovery circuit CDR may generate the second frequency counting result (or the second frequency information FI2), and at a fourth time point tt4a, the frequency counter FCON may store the second frequency counting result (or the second frequency information FI2) in the register REG. Here, a time for tracking the second frequency information FI2 from the third time point tt3a to the fourth time point tt4a may be also referred to as a second frequency locking time LT3a. At this time, since the frequency counter FCON tracks the frequency information of the second clock training pattern CLK-T2 based on the first frequency information FI1 of the first clock training pattern CLK-T1, the frequency counter FCON may generate the second frequency counting result (or the second frequency information FI2) from the second clock training pattern CLK-T2 during a time shorter than the tracking time of the first clock training pattern CLK-T1.

In an embodiment, when the frequency information of the current clock training pattern is tracked, since the frequency information of the previous clock training pattern is used, a time for tracking the frequency information of the current clock training pattern may be shortened. Therefore, in an embodiment, the locking time of the clock training pattern may be shortened.

The second frequency counting result (or the second frequency information FI2) may be stored, and at a fifth time point tt5a, the clock data recovery circuit CDR may load the first phase counting result (or the first phase information PI1) from the register REG.

The clock data recovery circuit CDR may track the phase information from the second clock training pattern CLK-T2. The phase information tracked from the second clock training pattern CLK-T2 may be also referred to as the second phase counting result (or the second phase information PI2). At this time, the phase counter PCON and the third digital-to-analog converter DAC3 may be enabled. In addition, the first digital-to-analog converter DAC1 that converts the first payload ePayload (or a (1-2)-th payload ePayload2) may be enabled.

The phase counter PCON of the clock data recovery circuit CDR may generate the second phase counting result (or the second phase information PI2), and at a sixth time point tt6a, the phase counter PCON may store the second phase counting result (or the second phase information PI2) in the register REG. Similarly to the first phase counting result (or the first phase information PI1) generated from the first clock training pattern CLK-T1, since the (1-2)-th payload ePayload2 includes the phase information of the second clock training pattern CLK-T2, the phase counter PCON may generate the second phase counting result (or the second phase information PI2) and store the second phase counting result (or the second phase information PI2) in the register REG at the sixth time point tt6a after the (1-2)-th payload ePayload2 is received. At this time, a time for tracking the second phase information PI2 from the fifth time point tt5a to the sixth time point tt6a may be also referred to as a second phase locking time LT4a.

At this time, the phase counter PCON may generate the second phase counting result (or the second phase information PI2) during a time shorter than the tracking time of the first phase information PI1 of the first clock training pattern CLK-T1.

In an embodiment, when the phase information of the current clock training pattern is tracked, since the phase counting result of the previous clock training pattern is used, a time for tracking the phase information of the current clock training pattern may be shortened. Therefore, in an embodiment, the locking time of the clock training pattern may be shortened.

Referring to FIGS. 10 and 11, the clock data recovery circuit CDR in an embodiment may use the first frequency counting result (or the first frequency information FI1) of the first clock training pattern CLK-T1 as the frequency information of a clock training pattern after the first clock training pattern CLK-T1. Since FIG. 10 is similar to the diagram shown in FIG. 8, and hereinafter, differences are mainly described in order to avoid a repetitive description.

In the idle period Idle, the clock data recovery circuit CDR may use the frequency information of the first clock training pattern CLK-T1 in frequency information of a subsequent clock training pattern when an external factor such as a voltage and temperature applied to the clock data recovery circuit CDR corresponds to a degree that does not affect the performance change of the clock data recovery circuit CDR.

Specifically, the frequency counter FCON of the clock data recovery circuit CDR may generate the first frequency counting result (or the first frequency information FI1), and at a first time point tt1b, the frequency counter FCON may store the first frequency counting result (or the first frequency information FI1) in the register REG. Here, a time for tracking the first frequency information FI1 until the first time point tt1b may be also referred to as a first frequency locking time LT1b.

The phase counter PCON of the clock data recovery circuit CDR may generate the first phase counting result (or the first phase information PI1), and at a second time point tt2b, the phase counter PCON may provide the first phase counting result (or the first phase information PI1) to the register REG. Here, a time for tracking the first phase information PI1 from the first time point tt1b to the second time point tt2b may be also referred to as a first phase locking time LT2b.

After the idle period Idle is elapsed, at a third time point tt3b, the clock data recovery circuit CDR may load the first frequency counting result (or the first frequency information FI1) and the first phase counting result (or the first phase information PI1) from the register REG. Accordingly, in an embodiment, since the first frequency information FI1 is used as the second frequency information FI2 without tracking the frequency information of the second clock training pattern CLK-T2, a second frequency locking time LT3b for tracking the second clock training pattern CLK-T2 may be shortened.

The phase counter PCON of the clock data recovery circuit CDR may generate the second phase counting result (or the second phase information PI2), and at a fourth time point tt4b, the phase counter PCON may store the second phase counting result (or the second phase information PI2) in the register REG. Here, a time for tracking the second phase information PI2 from the third time point tt3b to the fourth time point tt4b may be also referred to as a second phase locking time LT4b.

At this time, the phase counter PCON may generate the second phase counting result (or the second phase information PI2) from the second clock training pattern CLK-T2 during a time shorter than a tracking time of the first phase information PI1 of the first clock training pattern CLK-T1. That is, in an embodiment, when the phase information of the current clock training pattern is tracked, since the phase counting result of the previous clock training pattern is used, the locking time for tracking the phase information of the current clock training pattern may be shortened.

In addition, in an embodiment, since the first frequency counting result (or the first frequency information FI1) of the first clock training pattern CLK-T1 is used in the frequency information of the clock training pattern after the first clock training pattern CLK-T1, a time for generating the clock signal by recovering the clock training pattern may be shortened.

Hereinafter, an effect of a receiver in an embodiment is described with reference to FIGS. 12 and 13.

Figure 12:
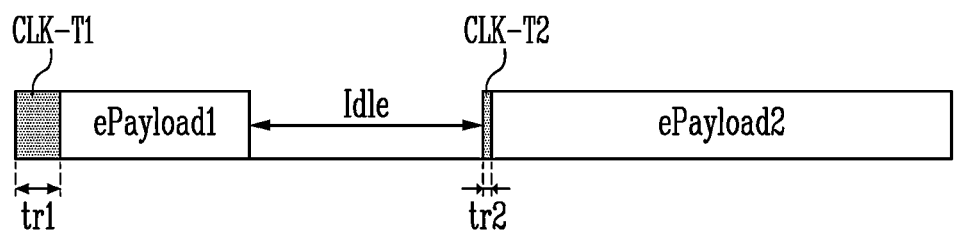
FIGS. 12 and 13 are diagrams illustrating an embodiment of an effect of a receiver.
Figure 13:
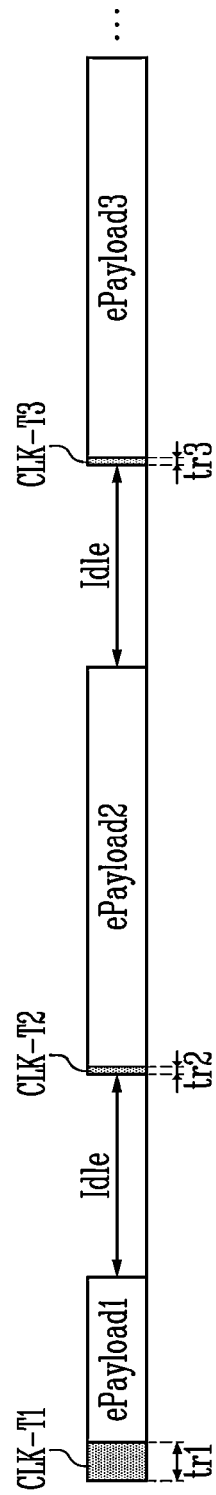

FIGS. 12 and 13 are diagrams illustrating an embodiment of an effect of a receiver. Hereinafter, an embodiment of the invention is described with reference to FIGS. 1 to 11 together.

Referring to FIG. 12, in an embodiment, the clock data recovery circuit CDR may receive the first clock training pattern CLK-T1 and the (1-1)-th payload ePayload1. After a predetermined period (e.g., the idle period Idle) is elapsed after receiving the (1-1)-th payload ePayload1, the clock data recovery circuit CDR may receive the second clock training pattern CLK-T2 and the (1-2)-th payload ePayload2. In an embodiment, the transmitter TXD may transmit the second clock training pattern CLK-T2 and the (1-2)-th payload ePayload2 to the receiver RXD after the predetermined period (e.g., the idle period Idle) is elapsed after transmitting the first clock training pattern CLK-T1 and the (1-1)-th payload ePayload1, but the invention is not limited thereto, and the predetermined period may be different from the idle period Idle.

The clock data recovery circuit CDR may track phase and frequency information of the first clock training pattern CLK-T1 during a first time tr1. Here, the first time tr1 may correspond to a time for locking at least one of the first frequency information and the first phase information. That is, the first time tr1 may include a portion of the first frequency locking time LT1a and the first phase locking time LT2a described with reference to FIG. 8.

Thereafter, the clock data recovery circuit CDR may track at least one of phase and frequency information of the second clock training pattern CLK-T2 during a second time tr2. Here, the second time tr2 may correspond to a locking time of at least one of the second frequency information FI2 and the second phase information PI2. That is, the second time tr2 may include a portion of the second frequency locking time LT3a and the second phase locking time LT4a described with reference to FIG. 8 or may include a portion of the second phase locking time LT4b described with reference to FIG. 10.

The second time tr2 for tracking at least one of the phase and frequency information of the second clock training pattern CLK-T2 may be shorter than the first time tr1 for tracking at least one of the phase and frequency information of the first clock training pattern CLK-T1. The locking time of the second clock training pattern CLK-T2 may be shorter than the locking time of the first clock training pattern CLK-T1. That is, in an embodiment, the locking time of the clock training pattern may be shortened.

Referring to FIG. 13, in an embodiment, the clock data recovery circuit CDR may receive the (1-2)-th payload ePayload2, and after a predetermined period (e.g., the idle period Idle) is elapsed, the clock data recovery circuit CDR may receive a third clock training pattern CLK-T3 and a (1-3)-th payload ePayload3. In an embodiment, the idle period Idle between the (1-2)-th payload ePayload2 and the third clock training pattern CLK-T3 may be the same as or different from the idle period Idle between the (1-1)-th payload ePayload1 and the second clock training pattern CLK-T2.

The clock data recovery circuit CDR may track the phase and frequency information of the second clock training pattern CLK-T2 during a second time tr2. Thereafter, the clock data recovery circuit CDR may track phase and frequency information of the third clock training pattern CLK-T3 during a third time tr3.

The time tr3 for tracking at least one of the phase and frequency information of the third clock training pattern CLK-T3 may be shorter than the time tr1 for tracking at least one of the phase and frequency information of the first clock training pattern CLK-T1. The locking time of the third clock training pattern CLK-T3 may be shorter than the locking time of the first clock training pattern CLK-T1, and may be different from the locking time of the second clock training pattern CLK-T2. That is, in an embodiment, the locking time of the clock training pattern may be shortened.

In an embodiment, when tracking at least one of the phase and frequency information of the current clock training pattern, since at least one of the phase and frequency counting result of the previous clock training pattern is used, the time for tracking at least one of the phase and frequency information of the current clock training pattern may be shortened. That is, the locking time of the clock training pattern may be shortened.

Hereinafter, a display device to which a transceiver may be applied is described with reference to FIG. 14.

Figure 14:
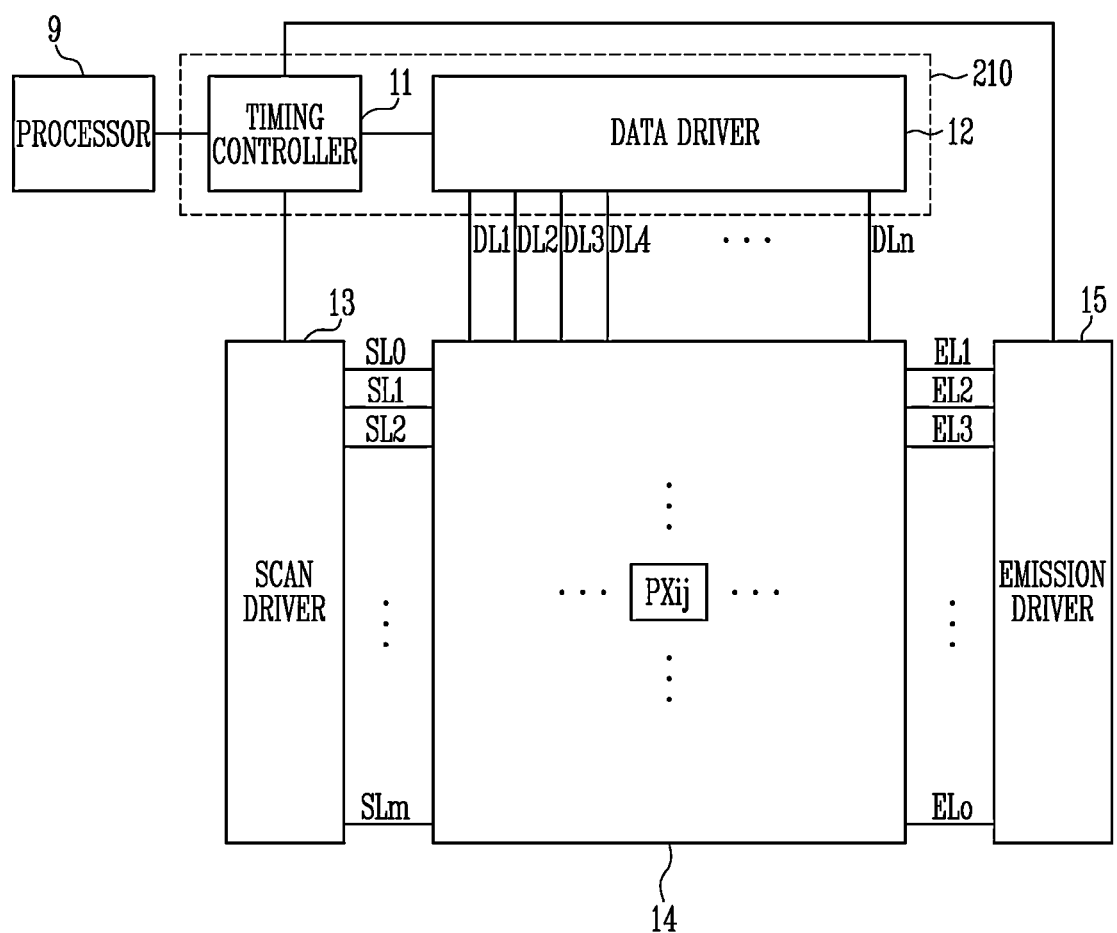
FIG. 14 is a diagram schematically illustrating an embodiment of a display device.

FIG. 14 is a diagram schematically illustrating an embodiment of a display device.

Referring to FIG. 14, the display device may include a timing controller 11, a data driver 12, a scan driver 13, a pixel unit 14, and an emission driver 15. Whether each functional unit is integrated into one IC, integrated into a plurality of ICs, or disposed (e.g., mounted) on a display substrate may be variously configured according to a specification of the display device.

The timing controller 11 and the data driver 12 may be integrated into one IC and may be configured as one display driver 210. At this time, the display driver 210 may be also referred to as the above-described TED (TCON Embedded Driver IC). According to a type, the display driver 210 may further include at least one of the scan driver 13 and the emission driver 15.

A processor 9 may correspond to at least one of a GPU, a CPU, an AP, or the like. The processor 9 may correspond to the above-described transmitter TXD. The timing controller 11, the data driver 12, or the display driver 210 may correspond to the above-described receiver RXD (refer to FIG. 1).

The timing controller 11 may receive grayscales and timing signals for each display frame period from the processor 9. The timing signals may include a vertical synchronization signal, a horizontal synchronization signal, a data enable signal, or the like.

Each cycle of the vertical synchronization signal may correspond to each display frame period. Each cycle of the horizontal synchronization signal may correspond to each horizontal period. The grayscales may be supplied in a horizontal line unit in each horizontal period in response to a pulse of the data enable signal. The horizontal line may mean pixels (e.g., a pixel row) connected to the same scan line and emission line.

The timing controller 11 may render the grayscales to correspond to the specification of the display device. In an embodiment, the processor 9 may provide a red grayscale, a green grayscale, and a blue grayscale for each unit dot, for example. In an embodiment, when the pixel unit 14 has an RGB stripe structure, the pixels may correspond to each grayscale one-to-one, for example. In this case, rendering of the grayscales may not be desired. However, for example, when the pixel unit 14 has a PENTILE™ structure, since the pixel is shared by adjacent unit dots, the pixels may not correspond to each grayscale one-to-one. In this case, rendering of the grayscales may be desired. The rendered or non-rendered grayscales may be provided to the data driver 12. In addition, the timing controller 11 may provide a data control signal to the data driver 12. In addition, the timing controller 11 may provide a scan control signal to the scan driver 13 and may provide an emission control signal to the emission driver 15.

The data driver 12 may generate data voltages (that is, data signals DLn) to be provided to data lines DL1, DL2, DL3, and DL4 to DLn using the grayscales and the data control signal received from the timing controller 11. Here, n may be an integer greater than 0.

The scan driver 13 may generate scan signals to be provided to scan lines SL0, SL1, and SL2 to SLm using the scan control signal (e.g., a clock signal, a scan start signal, or the like) received from the timing controller 11. Here, m may be an integer greater than 0. The scan driver 13 may sequentially supply scan signals having a pulse of a turn-on level to the scan lines SL0 to SLm. The scan driver 13 may include scan stages configured in a form of a shift register. The scan driver 13 may generate the scan signals in a method of sequentially transferring the scan start signal that is a pulse form of a turn-on level to a next scan stage according to control of the clock signal.

The emission driver 15 may generate emission signals to be provided to emission lines EL1, EL2, and EL3 to ELo using the emission control signal (e.g., a clock signal, an emission stop signal, or the like) received from the timing controller 11. Here, o may be an integer greater than 0. The emission driver 15 may sequentially supply emission signals having a pulse of a turn-off level to the emission lines EL1, EL2, and EL3 to ELo. The emission driver 15 may include emission stages configured in a form of a shift register. The emission driver 15 may generate the emission signals in a method of sequentially transferring the emission stop signal that is a pulse form of a turn-off level to a next emission stage according to control of the clock signal.

The pixel unit 14 includes the pixels. Each pixel PXij may be connected to corresponding data line, scan line, and emission line. Here, i may be an integer greater than 0 and equal to or less than m, and j may be an integer greater than 0 and equal to or less than n. The pixels may include pixels emitting light of a first color, pixels emitting light of a second color, and pixels emitting light of a third color. The first color, the second color, and the third color may be different colors. In an embodiment, the first color may be one of red, green, and blue, the second color may be one other than the first color among red, green, and blue, and the third color may be one other than the first color and the second color among red, green, and blue, for example. In another embodiment, magenta, cyan, and yellow may be used instead of red, green, and blue as the first to third colors.

Hereinafter, the pixel included in FIG. 14 is described with reference to FIGS. 15 and 16.

Figure 15:
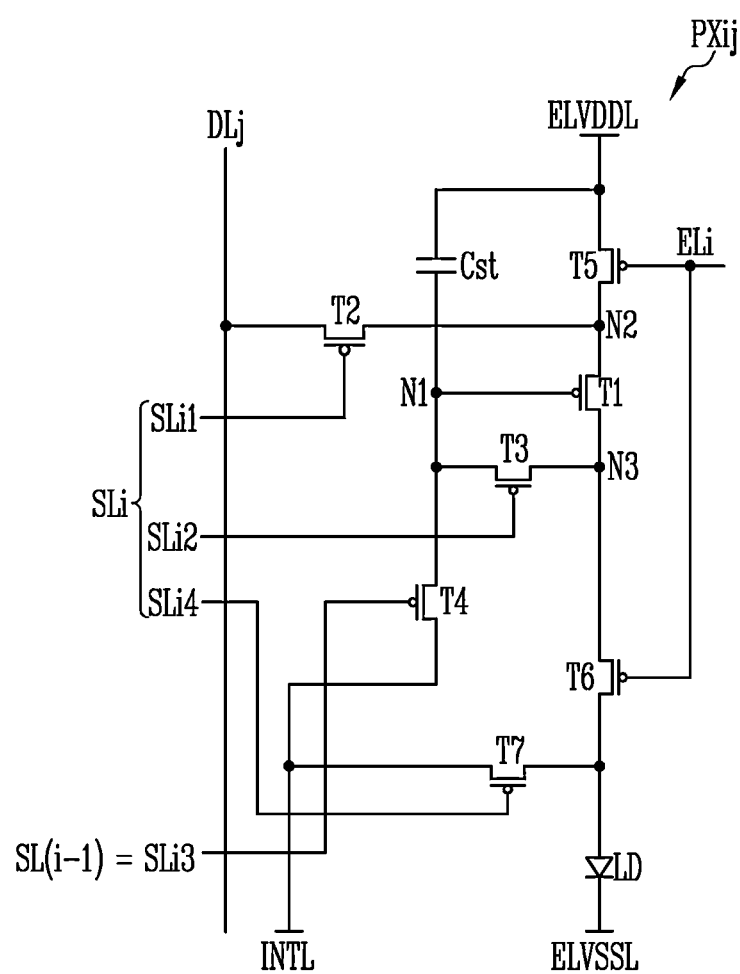
FIG. 15 is a circuit diagram illustrating a pixel included in FIG. 14.
Figure 16:
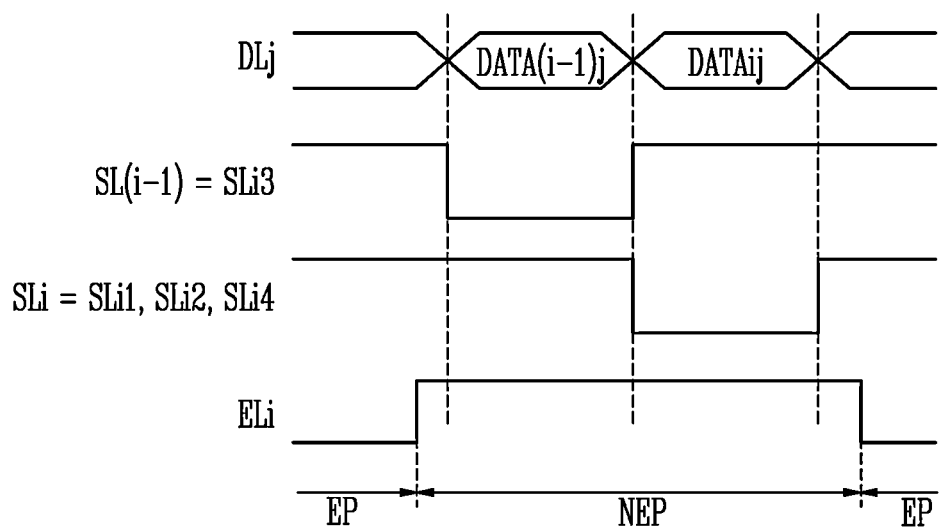
FIG. 16 is a timing diagram illustrating a method of driving the pixel shown in FIG. 15.

FIG. 15 is a circuit diagram illustrating the pixel included in FIG. 14, and FIG. 16 is a timing diagram illustrating a method of driving the pixel shown in FIG. 14.

Referring to FIG. 15, the pixel PXij includes transistors T1, T2, T3, T4, T5, T6, and T7, a storage capacitor Cst, and a light-emitting element LD.

Hereinafter, a circuit consisting of a P-type transistor is described as an example. However, those skilled in the art will be able to design a circuit consisting of an N-type transistor by differentiating a polarity of a voltage applied to a gate terminal. Similarly, those skilled in the art will be able to design a circuit consisting of a combination of a P-type transistor and an N-type transistor. The P-type transistor is collectively referred to as a transistor in which a current amount increases when a voltage difference between a gate electrode and a source electrode increases in a negative direction. The N-type transistor is collectively referred to as a transistors in which a current amount increases when a voltage difference between a gate electrode and a source electrode increases in a positive direction. In embodiments, the transistor may be configured in various forms such as a thin film transistor ("TFT"), a field effect transistor ("FET"), and a bipolar junction transistor ("BJT").

The first transistor T1 may include a gate electrode connected to a first node N1, a first electrode connected to a second node N2, and a second electrode connected to a third node N3. The first transistor T1 may be also referred to as a driving transistor.

The second transistor T2 may include a gate electrode connected to a scan line SLi1, a first electrode connected to a data line DLj, and a second electrode connected to the second node N2. The second transistor T2 may be also referred to as a scan transistor.

The third transistor T3 may include a gate electrode connected to a scan line SLi2, a first electrode connected to the first node N1, and a second electrode connected to the third node N3. The third transistor T3 may be also referred to as a diode connection transistor.

The fourth transistor T4 may include a gate electrode connected to a scan line SLi3, a first electrode connected to the first node N1, and a second electrode connected to an initialization line INTL. The fourth transistor T4 may be also referred to as a gate initialization transistor.

The fifth transistor T5 may include a gate electrode connected to an i-th emission line ELi, a first electrode connected to a first power line ELVDDL, and a second electrode connected to the second node N2. The fifth transistor T5 may be also referred to as an emission transistor. In another embodiment, the gate electrode of the fifth transistor T5 may be connected to an emission line different from an emission line connected to a gate electrode of the sixth transistor T6.

The sixth transistor T6 may include the gate electrode connected to the i-th emission line ELi, a first electrode connected to the third node N3, and a second electrode connected to an anode of the light-emitting element LD. The sixth transistor T6 may be also referred to as an emission transistor. In another embodiment, the gate electrode of the sixth transistor T6 may be connected to an emission line different from the emission line connected to the gate electrode of the fifth transistor T5.

The seventh transistor T7 may include a gate electrode connected to a scan line SLi4, a first electrode connected to the initialization line INTL, and a second electrode connected to the anode of the light-emitting element LD. The seventh transistor T7 may be also referred to as a light-emitting element initialization transistor.

A first electrode of the storage capacitor Cst may be connected to the first power line ELVDDL and a second electrode may be connected to the first node N1.

The anode of the light-emitting element LD may be connected to the second electrode of the sixth transistor T6 and a cathode may be connected to a second power line ELVSSL. The light-emitting element LD may be a light-emitting diode. In an embodiment, the light-emitting element LD may consist of an organic light-emitting element (organic light diode), an inorganic light-emitting element (inorganic light-emitting diode), a quantum dot/well light-emitting element (quantum dot/well light-emitting diode), or the like. The light-emitting element LD may emit light in any one of the first color, the second color, and the third color. In addition, although only one light-emitting element LD is provided in each pixel in the illustrated embodiment, a plurality of light-emitting elements may be provided in each pixel in another embodiment. At this time, the plurality of light-emitting elements may be connected in series, parallel, series-parallel, or the like.

The first power line ELVDDL may be supplied with a first power voltage, the second power line ELVSSL may be supplied with a second power voltage, and the initialization line INTL may be supplied with an initialization voltage. In an embodiment, the first power voltage may be greater than the second power voltage, for example. In an embodiment, the initialization voltage may be equal to or greater than the second power voltage, for example. In an embodiment, the initialization voltage may correspond to a data voltage of the smallest size among data voltages that may be provided, for example. In another embodiment, the size of the initialization voltage may be less than sizes of the data voltages that may be provided, for example.

Referring to FIG. 16, hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be various. In an embodiment, the scan line SLi4 may be the (i−1)-th scan line or an (i+1)-th scan line, for example.

First, an emission signal of a turn-off level (logic high level) is applied to the i-th emission line ELi, a data voltage DATA(i−1)j for an (i−1)-th pixel is applied to the data line DLj, and a scan signal of a turn-on level (logic low level) is applied to the scan line SLi3. The high/low of the logic level may vary according to whether a transistor is a P-type or an N-type.

At this time, since a scan signal of a turn-off level is applied to the scan lines SLi1 and SLi2, the second transistor T2 is turned off and the data voltage DATA(i–1)j is prevented from being input to the pixel PXij.

At this time, since the fourth transistor T4 is turned on, the first node N1 is connected to the initialization line INTL, and a voltage of the first node N1 is initialized. Since the emission signal of the turn-off level is applied to the emission line ELi, the transistors T5 and T6 are turned off, and light emission of an unnecessary light-emitting element LD according to an initialization voltage application process is prevented.

Next, a data voltage DATAij for the i-th pixel PXij is applied to the data line DLj, and the scan signal of the turn-on level is applied to the i-th scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be also referred to as a threshold voltage compensation period or a data writing period.

In addition, when the scan line SLi4 is the i-th scan line, since the seventh transistor T7 is turned on, the anode of the light-emitting element LD and the initialization line INTL are connected with each other, and the light-emitting element LD is initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light-emitting element LD, and the second power line ELVSSL may be provided.

A driving current amount flowing to the first electrode and the second electrode of the first transistor T1 is adjusted according to the voltage maintained in the storage capacitor Cst. The light-emitting element LD emits light with a luminance corresponding to the driving current amount. The light-emitting element LD emits light until the emission signal of the turn-off level is applied to the emission line ELi.

When the emission signal is the turn-on level, pixels receiving the corresponding emission signal may be in a display state. Therefore, a period in which the emission signal is the turn-on level may be also referred to as an emission period EP (or an emission allowable period). In addition, when the emission signal is the turn-off level, pixels receiving the corresponding emission signal may be in a non-display state. Therefore, a period in which the emission signal is the turn-off level may be also referred to as a non-emission period NEP (or an emission disallowable period).

The non-emission period NEP described with reference to FIG. 16 is for preventing the pixel PXij from emitting light with an undesired luminance during the initialization period and the data writing period.

One or more non-emission periods NEP may be additionally provided while data written in the pixel PXij is maintained (e.g., one frame period). This may be for effectively expressing a low grayscale by reducing the emission period EP of the pixel PXij, or for smoothly blurring a motion of an image.

The display device, the pixel, and the method of driving the same of FIGS. 14 to 16 are for illustrating one application embodiment of the above-described transceiver TSCV, and the invention is not limited to such an embodiment (refer to FIG. 1). In an embodiment, the transceiver TSCV may be used for communication between the processor 9 and a camera device included in the display device, or may be used for communication between the processor 9 and a touch sensor (and other sensors), for example.

Although the invention has been described with reference to the preferred embodiment above, those skilled in the art or those having a common knowledge in the art will understand that the invention may be variously modified and changed without departing from the spirit and technical area of the invention described in the claims which will be described later.

Therefore, the technical scope of the invention should not be limited to the contents described in the detailed description of the specification, but should be defined by the claims.

What is claimed is:

1. A transceiver comprising:
a transmitter and a receiver connected to each other through a first line and a second line, the receiver including:
a clock data recovery circuit; and
a register,
wherein the transmitter transmits first signals having a first voltage range to the first line and the second line in a first mode, and transmits second signals having a second voltage range less than the first voltage range to the first line and the second line in a second mode,
in transmitting a (1-1)-th payload to the receiver the transmitter is sequentially driven in the first mode, the second mode, and the first mode, and transmits a first clock training pattern and a (1-1)-th payload to the receiver in the second mode,
the clock data recovery circuit generates a first clock signal corresponding to the first clock training pattern transmitted from the transmitter to the receiver; and
the register stores first frequency information and first phase information of the first clock training pattern,
wherein the clock data recovery circuit receives the first clock training pattern and the (1-1)-th payload, and receives a second clock training pattern and a (1-2)-th payload after a predetermined period, and
the clock data recovery circuit generates a second clock signal corresponding to the second clock training pattern, and
the clock data recovery circuit generates the first clock signal by the first frequency information and the first phase information.

2. The transceiver according to claim 1, wherein the register provides the first frequency information and the first phase information to the clock data recovery circuit, and
the clock data recovery circuit generates second frequency information of the second clock training pattern based on the first frequency information, and generates second phase information based on the first phase information.

3. The transceiver according to claim 2, wherein a time for tracking at least one of the second frequency information and the second phase information is different from a time for tracking the first frequency information and the first phase information.

4. The transceiver according to claim 3, wherein the time for tracking the at least one of the second frequency information and the second phase information is shorter than the time for tracking the first frequency information and the first phase information.

5. The transceiver according to claim 4, wherein the clock data recovery circuit receives the second clock training pattern and the (1-2)-th payload, and receives a third clock training pattern and a (1-3)-th payload after a predetermined period.

6. The transceiver according to claim 5, wherein the register stores the second frequency information and the second phase information, and provides the second frequency information and the second phase information to the clock data recovery circuit, and
the clock data recovery circuit generates third frequency information of the third clock training pattern based on the second frequency information, and generates third phase information of the third clock training pattern based on the second phase information.

7. The transceiver according to claim 6, wherein a time for tracking at least one of the third frequency information and the third phase information is shorter than the time for tracking the first frequency information and the first phase information and is different from the time for tracking the second frequency information and the second phase information.

8. The transceiver according to claim 5, wherein the register stores second phase information of the second clock training pattern, and provides the first frequency information and the second phase information to the clock data recovery circuit, and
the clock data recovery circuit reflects the first frequency information to use the first frequency information as third frequency information of the third clock training pattern, and generates third phase information of the third clock training pattern based on the second phase information.

9. A transceiver comprising:
a transmitter including a first data transmitter; and
a receiver including a first data receiver connected to the first data transmitter through a first line and a second line, the first data receiver comprising:
　a clock data recovery circuit which generates a first clock signal corresponding to a first clock training pattern; and
　a register which stores first frequency information and first phase information of the first clock training pattern,
wherein the clock data recovery circuit receives a first clock training pattern and a (1-1)-th payload from the first data transmitter, and receives a second clock training pattern and a (1-2)-th payload after a predetermined period, and
a time duration for tracking second frequency information and second phase information of the second clock training pattern is shorter than a time duration for tracking the first frequency information and the first phase information.

10. The transceiver according to claim 9, wherein the clock data recovery circuit comprises:
　a frequency counter which counts the first frequency information of the first clock training pattern and provides the first frequency information to the register; and
　a phase counter which counts the first phase information of the first clock training pattern and the (1-1)-th payload and provides the first phase information to the register.

11. The transceiver according to claim 10, wherein in the second clock training pattern, the register provides the first frequency information to the frequency counter, and the frequency counter counts the second frequency information from the second clock training pattern based on the first frequency information.

12. The transceiver according to claim 11, wherein in the second clock training pattern, the register provides the first phase information to the phase counter, and the phase counter counts the second phase information from the second clock training pattern based on the first phase information.

13. The transceiver according to claim 12, wherein the clock data recovery circuit receives the second clock training pattern and the (1-2)-th payload from the first data transmitter, and receives a third clock training pattern and a (1-3)-th payload after a predetermined period, and
　a time for tracking third frequency information and third phase information of the third clock training pattern is shorter than the time for tracking the first frequency information and the first phase information and is different from the time for tracking the second frequency information and the second phase information.

14. The transceiver according to claim 13, wherein in the third clock training pattern, the register provides the second frequency information to the frequency counter, and the frequency counter counts the third frequency information based on the second frequency information.

15. The transceiver according to claim 14, in the third clock training pattern, the register provides the second phase information to the phase counter, and the phase counter counts the third phase information based on the second phase information.

16. The transceiver according to claim 13, wherein in the third clock training pattern, the register provides the first frequency information to the frequency counter, and the frequency counter reflects the first frequency information to use the first frequency information as the third frequency information of the third clock training pattern.

17. A method of driving a transceiver including a transmitter and a receiver connected through a first line and a second line, the method comprising:
　transmitting, by the transmitter, first signals having a first voltage range to the first line and the second line in a first mode;
　transmitting, by the transmitter, second signals having a second voltage range less than the first voltage range to the first line and the second line in a second mode; and
　sequentially transmitting, by the transmitter, the first signals having the first voltage range to the first line and the second line in the first mode,
　wherein in transmitting a (1-1)-th payload and a (1-2)-th payload to the receiver, in the second mode, the transmitter transmits a first clock training pattern and the (1-1)-th payload to the receiver, and transmits a second clock training pattern and the (1-2)-th payload to the receiver after a predetermined period,
　the method further comprises receiving, by the receiver, the second clock training pattern and the (1-2)-th payload after a predetermined period after receiving the first clock training pattern and the (1-1)-th payload, and
　a time for tracking second frequency information and second phase information of the second clock training pattern is shorter than a time for tracking first frequency information and first phase information of the first clock training pattern.

18. The method according to claim 17, wherein the receiver receives a third clock training pattern and a (1-3)-th payload after a predetermined period after receiving the second clock training pattern and the (1-2)-th payload, and a time for tracking third frequency information and third phase information of the third clock training pattern is shorter than the time for tracking the first frequency information and the first phase information and is different from the time for tracking the second frequency information and the second phase information.

\* \* \* \* \*